United States Patent [19]
Yamazaki et al.

[11] Patent Number: 5,930,111
[45] Date of Patent: Jul. 27, 1999

[54] OVERHEAD INSTALLED COMMUNICATION EQUIPMENT

[75] Inventors: Naoya Yamazaki; Yasushi Kojima; Hisato Sato, all of Kawasaki, Japan

[73] Assignee: Fujitsu Limited, Kawasaki, Japan

[21] Appl. No.: 08/951,006

[22] Filed: Oct. 15, 1997

[30] Foreign Application Priority Data

| | | | |
|---|---|---|---|
| Mar. 7, 1997 | [JP] | Japan | 9-053540 |
| Apr. 8, 1997 | [JP] | Japan | 9-089470 |

[51] Int. Cl.$^6$ .................................................. H05K 7/20
[52] U.S. Cl. .......................... 361/690; 361/683; 361/695; 361/704; 361/732; 236/44 R; 174/50.51; 165/80.3; 439/719; 250/227.24
[58] Field of Search ...................................... 361/683, 680, 361/622, 687, 700–709, 688, 690, 718–725, 732, 818, 827, 831, 677, 801, 749, 704–710, 735; 211/41.17; 257/686; 200/50.12, 43.22; 219/494; 220/3.8; 236/44 R; 250/227.24, 254, 551; 385/50, 24; 165/80.3, 80.4, 80.2, 104.33, 104.34; 174/50.51, 16.1, 35 R; 439/719

[56] References Cited

U.S. PATENT DOCUMENTS

| | | | |
|---|---|---|---|
| 4,529,674 | 7/1985 | Brooks | 429/71 |
| 4,905,579 | 3/1990 | Dame | 98/1.5 |
| 5,225,961 | 7/1993 | Zander et al. | 361/356 |
| 5,243,493 | 9/1993 | Jeng et al. | 361/690 |
| 5,253,143 | 10/1993 | Klinger et al. | 361/736 |
| 5,267,122 | 11/1993 | Glover et al. | 361/704 |
| 5,469,328 | 11/1995 | Palaszewski | 361/688 |

*Primary Examiner*—Leo P. Picard
*Assistant Examiner*—Michael Datskovsky
*Attorney, Agent, or Firm*—Staas & Halsey LLP

[57] ABSTRACT

An overhead installed communication system includes a cabinet body which includes an electronic circuit device and a door which is supported by the cabinet body through a hinge so that the door can be opened and closed. The system is installed overhead and external cables are introduced into the system. A box is provided inside the door, and the box is sealed in a condition where a lid is closed. A connector is provided in the box, electric wires extending from the electronic circuit device are connected to the connector and the external cables are connected to the connector after being introduced into the system.

16 Claims, 18 Drawing Sheets

OVERHEAD INSTALLED COMMUNICATION EQUIPMENT

BACKGROUND OF THE INVENTION

1. Field of the Invention

The present invention relates to an overhead installed communication system, and, in particular, to an optical subscriber-line network unit installed overhead in the open air.

FIG. 1 generally shows a communication system to which optical subscriber-line network units are applied. This communication system has been proposed as a near feature system for the multimedia-oriented trend. In this communication system, an optical cable extends just in front of each house.

Telephone stations 10 and 11 are connected through an optical cable 12 with one another. A plurality of optical cables 13 extending from the telephone station 11 are laid between poles 14 and reach to just in front of houses 15, respectively. For example, one overhead installed optical subscriber-line network unit 20 is provided for each ten houses and is installed overhead in the open air. Each optical subscriber-line network unit 20 includes a light-electricity converter 21, a multiplexer and demultiplexer unit 22 and ten-odd subscriber channel units 23. An extending end of each optical cable 13 is connected to a respective optical subscriber-line network unit 20 and also a power line 17 is connected to the unit 20. Each optical subscriber-line network unit operates with power supplied through the power line 17. One external metal cable 18 extends from each subscriber channel unit 23, and thus, ten-odd external metal cables 18 extend from each optical subscriber-line network unit 20. Each external metal cable 18 extends into the respective house 15 and is connected to a communication terminal 19 for a telephone, a facsimile machine and so forth.

In this communication system, each optical cable 13 extends just in front of the houses and the length of each external metal cable 18 is short. Accordingly, it is possible to transmit a large amount of information in comparison to the prior art. Voice transmission, image transmission, digital signal transmission and so forth are performed.

Because each optical subscriber-line network unit 20 is installed overhead in the open air, it is desired that each unit 20 be miniaturized, lightweight, weatherproof, have superior reliability, and so forth.

2. Description of the Related Art

Recently, various optical subscriber-line network units installed overhead in the open air are being developed.

However, it has been difficult to develop an overhead installed optical subscriber-line network unit which is waterproof, has heat radiating performance and so forth in the condition where the unit is miniaturized and lightweight.

SUMMARY OF THE INVENTION

An object of the present invention is to provide an overhead installed communication system in which the above-mentioned problem is solved.

An overhead installed communication system, according to the present invention comprises a cabinet body including an electronic circuit device, and a door which is supported by the cabinet body through a hinge so that the door can be opened and closed, the system being installed overhead and external cables being introduced into the system, wherein:
a box is provided inside the door, the box being sealed in a condition where a lid is closed; and
a connector is provided in the box, electric wires extending from the electronic circuit device being connected to the connector and the external cables being connected to the connector after being introduced into the system.

Thereby, if rain water flows on and along the external cables and enters the overhead installed communication system, the rain water is contained in the box and does not reach the electronic circuit portion. Accordingly, highly reliable waterproof performance can be achieved.

It may be that through holes through which the external cables are introduced into the system extend obliquely downward from the inside of the system to the outside of the system. Thereby, directly falling rain water, rain water flowing on and along the external cables and so forth can be effectively prevented from entering the overhead installed communication system.

Another overhead installed communication system, according to the present invention, comprises a cabinet body including an electronic circuit device, and a door which is supported by the cabinet body through a hinge so that the door can be opened and closed, the system being installed overhead and external cables being introduced into the system wherein:
a plurality of pins are arranged in a position in which the external cables are introduced in three or more rows and in a staggered manner; and
the external cables extend across all the rows in a condition where the external cables pass through and wind between pins.

In such an arrangement, due to the friction forces occurring between the external cables and pins, the cables are held by the pins. Thereby, in comparison to a case where a clamp member is used, the plurality of external cables are easily held without using tools in the narrow space. Because the plurality of external cables are held in the narrow space, the overhead installed communication system can be miniaturized.

Another overhead installed communication system, according to the present invention, comprises a cabinet body including an electronic circuit device and a battery portion and a door which is supported by the cabinet body through a hinge so that the door can be opened and closed, the system being installed overhead and the external cables being introduced into the system, wherein the battery portion has a structure in which a battery is contained in a sealed-structure box, and tube means extends from the box to the outside of the overhead installed communication system.

Thereby, it is possible to cause hydrogen generated when the battery is excessively charged to flow out to the outside of the overhead installed communication equipment. Thereby, danger that hydrogen leaks into the overhead installed communication equipment can be surely avoided.

It may be that:
the box includes a box body and a front lid;
wherein, in a condition where the door is closed, projection portions provided inside the door press a periphery of the lid, which covers the box body, so as to press the periphery of the lid to the box body.

Thereby, it is possible to achieve a sealed structure of the box more surely. Accordingly, leakage of hydrogen generated when the battery is excessively charged from the box can be surely prevented.

It may be that the tube means has an obliquely downward opening, as a result of being cut at an external end of the overhead installed communication system. Accordingly, rain water is not likely to enter the opening.

Another overhead installed communication system, according to the present invention, comprises a cabinet body including a plurality of electronic circuit devices and a door which is supported by the cabinet body through a hinge so that the door can be opened and closed, the system being installed overhead and external cables being introduced into the system, wherein:
the electronic circuit devices comprise a light-electricity converter, multiplexer and demultiplexer unit, a power-source circuit device, a battery portion, and a subscriber channel unit portion; and
the power-source circuit device is treated as a center and the light-electricity converter, multiplexer and demultiplexer unit, the battery portion and the subscriber channel unit portion are arranged radially so as to surround the power-source circuit device.

By this arrangement, it is possible to shorten the lengths of electric wires in the system. Accordingly, unnecessary electromagnetic wave radiation from the electric wires in the system is reduced. As a result, operation quality of the overhead installed communication system can be improved. Further, because the lengths of the electric wires can be shortened, the space necessary for containing the electric wires can be narrowed. Accordingly, it is possible to miniaturize the overhead installed communication system. Further, because the lengths of the electric wires can be shortened, voltage loss can be reduced.

Another overhead installed communication system, according to the present invention, comprises a cabinet body including an electronic circuit device, and a door which is supported by the cabinet body through a hinge so that the door can be opened and closed, the system being installed overhead and external cables being introduced into the system, wherein the electronic circuit device has a structure in which a print board assembly of a plurality of print boards are loaded in a shelf, and good-thermal-conductor members have one end which is in contact with an inner surface of the cabinet body and another end which passes through the shelf and is arranged in parallel to the loaded print board assembly.

Thereby, the heat generated from the print board assembly can be efficiently radiated to the outside of the overhead installed communication system. Accordingly, it is possible that the overhead installed communication system operates normally under a thermally severe condition.

Another overhead installed communication system, according to the present invention, comprises a cabinet body including an electronic circuit device in which a print board assembly of a plurality of print boards is loaded in a shelf and a door which is supported by the cabinet body through a hinge so that the door can be opened and closed, the system being installed overhead and external cables being introduced into the system, wherein the system comprises:
a good-thermal-conductor member assembly in which a plurality of good-thermal-conductor members, each having a long-plate shape and being bent appropriately, are piled; and
a good thermally conductive interposition member, one side surface thereof being closely fixed onto an internal surface of the cabinet body, and the other side surface thereof having one end side of the good-thermal-conductor member assembly fixed thereto;
the one end side of the good-thermal-conductor member assembly having a stair shape as a result of the good-thermal-conductor members having different lengths in sequence being piled, and, in the other end side of the good-thermal-conductor member assembly, each good-thermal-conductor member passes through the shelf and is arranged in parallel to the loaded print board assembly;
the other side surface of the interposition member having a stair shape corresponding to the stair shape of the one end side of the good-thermal-conductor member assembly; and
the one end side of the good-thermal-conductor member assembly of the stair shape coming into contact with the other side surface of the interposition member of the stair shape, and thus, each good-thermal-conductor member being closely in contact with the interposition member.

Thereby, the heat propagated in each good-thermal-conductor member does not need to cross other good-thermal-conductor members in the thickness direction and thus can be efficiently propagated to the cabinet body. Accordingly, the heat generated from the print board assembly can be efficiently radiated to the outside of the overhead installed communication system.

Another overhead installed communication system, according to the present invention, comprises a cabinet body including an electronic circuit device in which a print board assembly of a plurality of print boards is loaded in a shelf, and a door which is supported by the cabinet body through a hinge so that the door can be opened and closed, the system being installed overhead and external cables being introduced into the system, wherein:
the system comprises a good-thermal-conductor member assembly in which a plurality of good-thermal-conductor members, each having a long-plate shape and being bent appropriately, are piled;
in one end side of the good-thermal-conductor member assembly, good-thermal-conductor members, which have different lengths in sequence and are bent in step heights each corresponding to the thickness of each good-thermal-conductor member, are piled, and all of the good-thermal-conductor members have the same height at the extending end side portions, and, in the other end side of the good-thermal-conductor member assembly, each good-thermal-conductor member passes through the shelf and is arranged in parallel to the loaded print board assembly; and
the extending end side portions of the good-thermal-conductor members of the good-thermal-conductor member assembly are independently, closely in contact with an inner surface of the cabinet body, respectively.

Thereby, the heat propagated in each good-thermal-conductor member can be directly propagated to the cabinet body. Accordingly, the heat generated from the print board assembly can be efficiently radiated to the outside of the overhead installed communication system.

It may be that the cabinet body is provided with a sunshade plate in a condition where the sunshade plate is positioned away from the cabinet body and so as to cover a top plate of the cabinet body. Thereby, an increased temperature rising of the good-thermal-conductor members can be prevented and heat radiation efficiency can be improved.

Other objects and further features of the present invention will become more apparent from the following detailed description when read in conjunction with the accompanying drawings.

DETAILED DESCRIPTION OF THE PREFERRED EMBODIMENT

Figure 1:
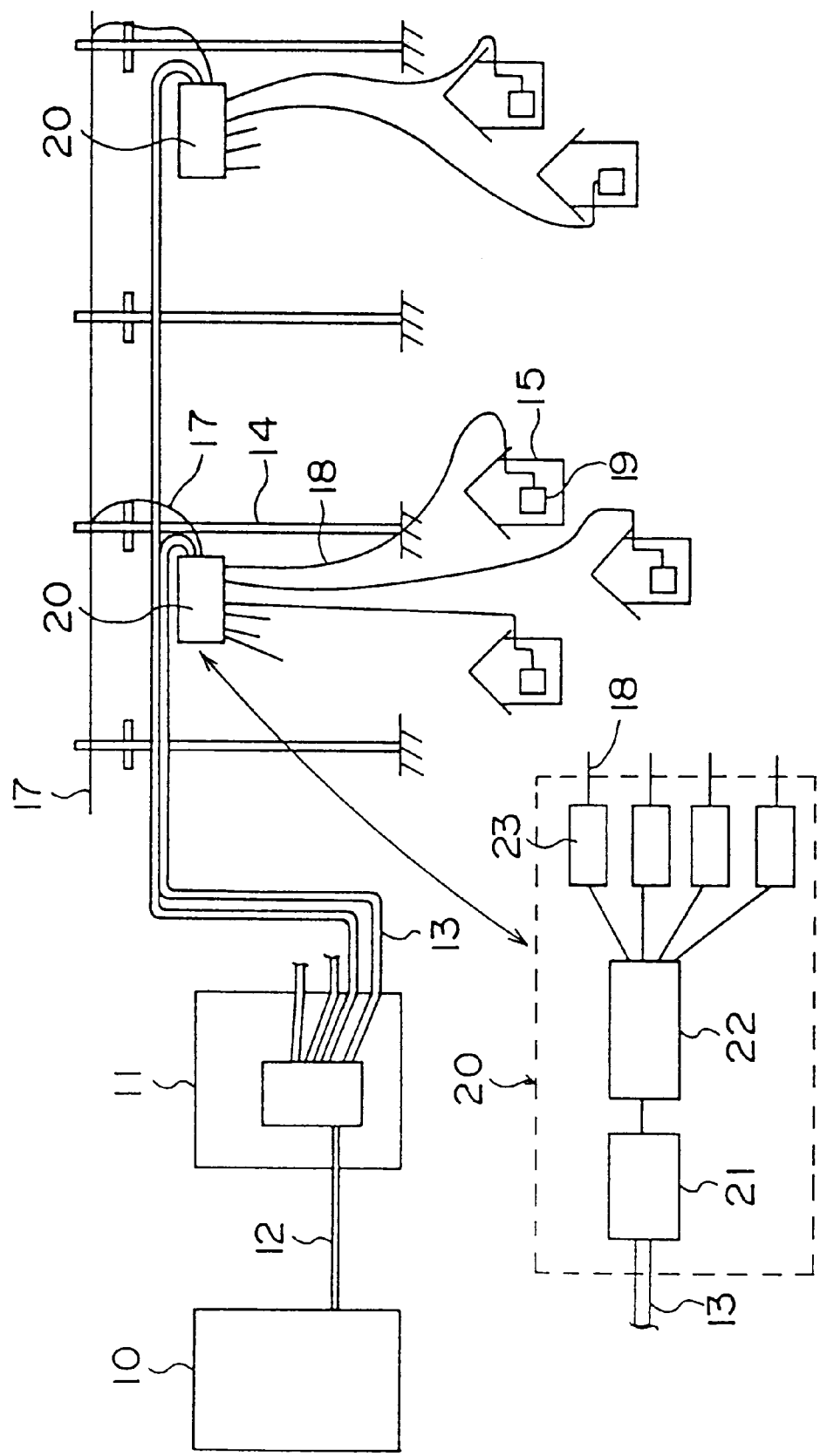
FIG. 1 generally shows a communication system to which an optical subscriber-line network unit is applied.
Figure 2:
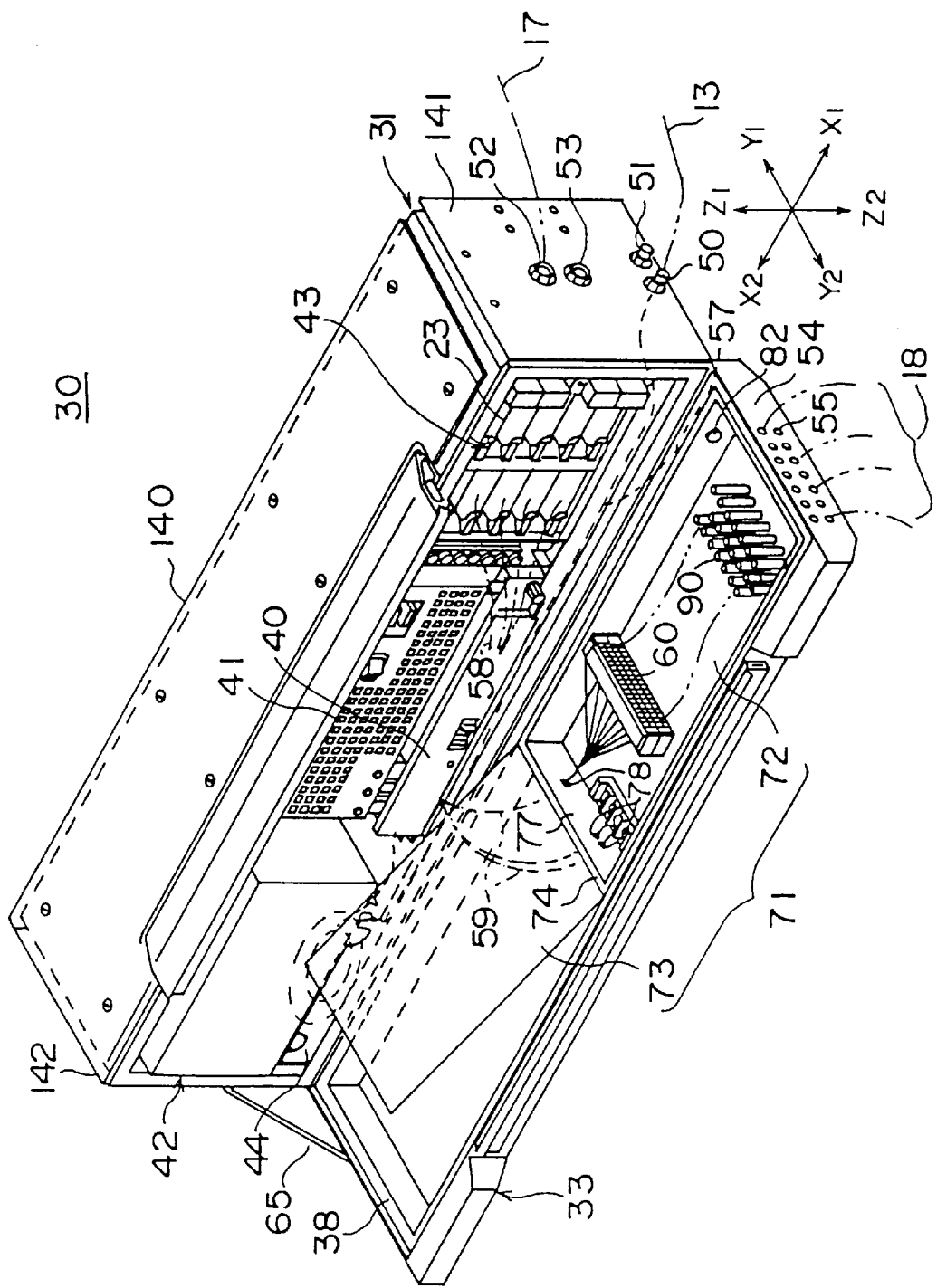
FIG. 2 shows a perspective view of a overhead installed optical subscriber-line network unit in an embodiment of the present invention in a condition where a door is opened.
Figure 3:
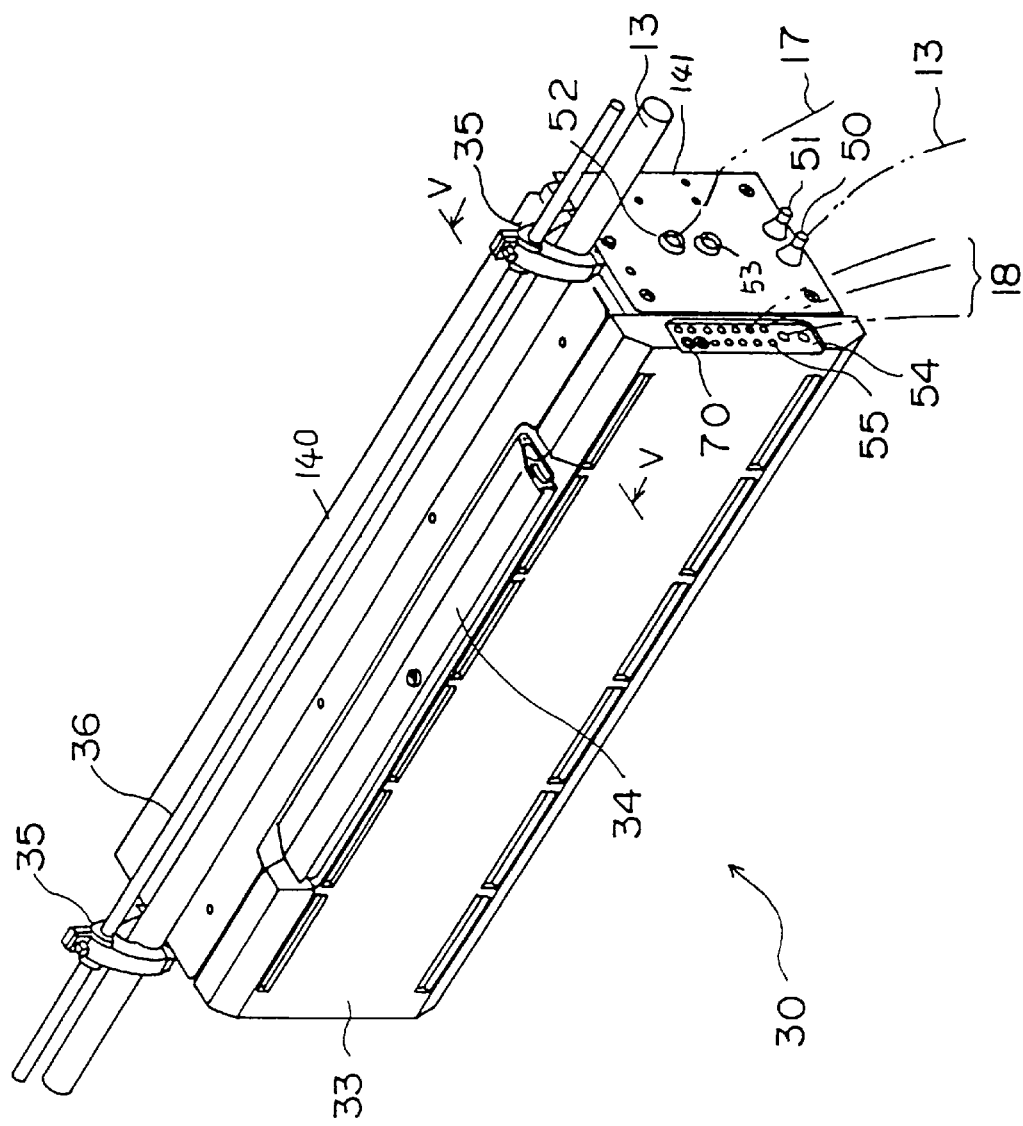
FIG. 3 shows a perspective view of the optical subscriber-line network unit of FIG. 2 in a condition where the unit has been installed.

FIG. 2 shows an overhead installed optical subscriber-line network unit 30 in an embodiment of the present invention in a condition where a door is opened. FIG. 3 shows the optical subscriber-line network unit 30 in a condition where the unit 30 is installed.

An outline of the optical subscriber-line network unit 30 will now be described.

The optical subscriber-line network unit 30 is, as shown in FIG. 3, hung by a supporting line 36 through hooks 35 at the two ends in X1 and X2 directions. The unit 30 is thus installed horizontally. Hereinafter, this position is referred to as a reference position. The supporting line is supported by poles and stretched therebetween and hangs so as to support an optical cable 13 which extends to nearby respective houses. The hooks 35 bundle the optical cable 13.

The optical subscriber-line network unit 30 includes a cabinet body 31 and a door 33. The cabinet body 31 is made of die cast aluminum, has a rectangular-parallelepiped shape and an opening is formed in front of the cabinet body 31. The door 33 is made of die cast aluminum, and is supported by a bottom plate 31a of the cabinet body 31 through a hinge 32 so that the door 33 rotates and can be opened and closed. Ordinarily, the door 33 covers the front opening of the cabinet body 31 and a buckle 34 fastens the door 33 to the cabinet body 31. Inside the door 33, along the periphery, rubber-made, rectangular-frame-shaped waterproof packing 38 is provided. Thereby when the door has been closed, the cabinet body 31 and the door 33 are sealed.

Figure 5:
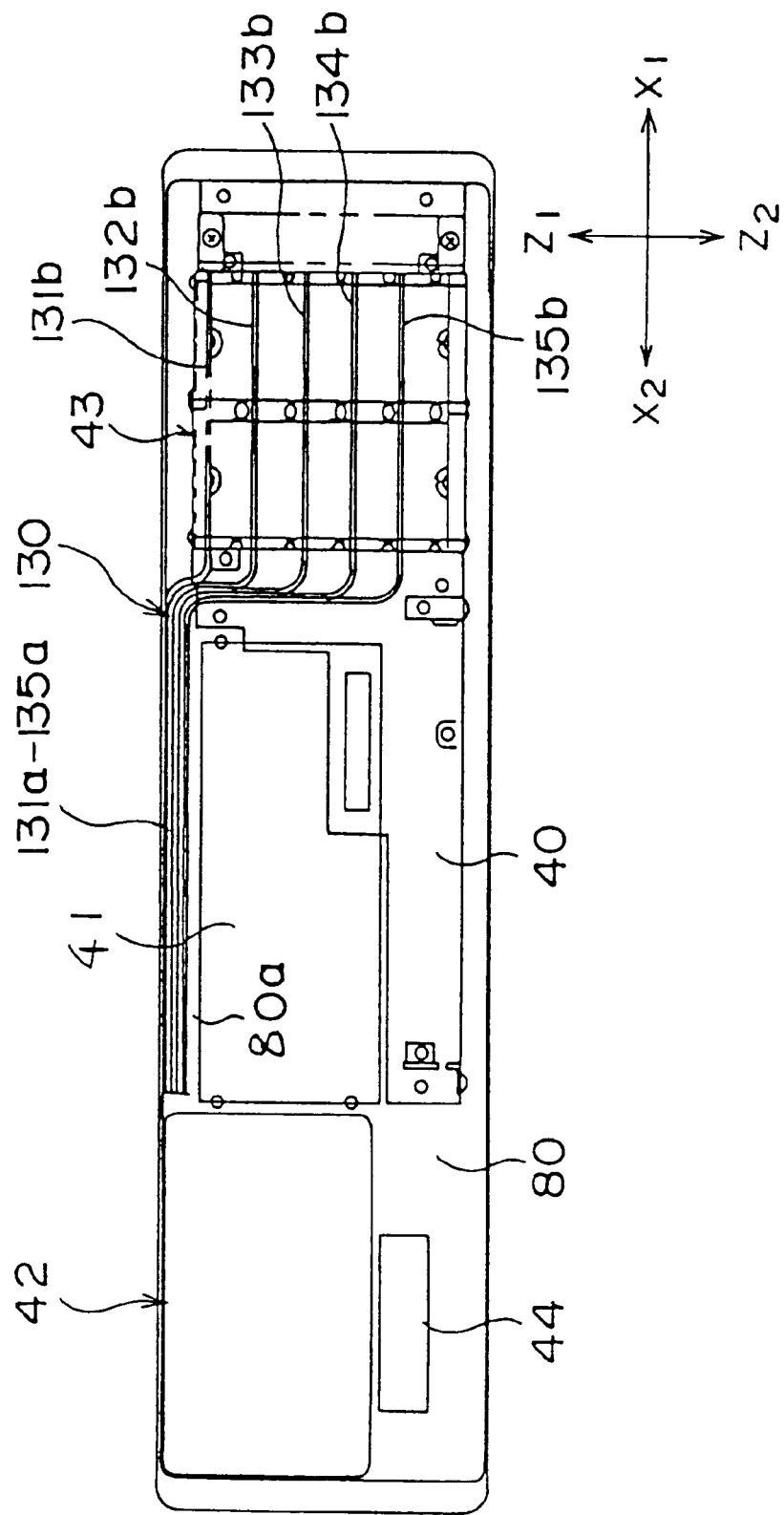
FIG. 5 shows an arrangement of respective portions inside the optical subscriber-line network unit.
Figure 6:
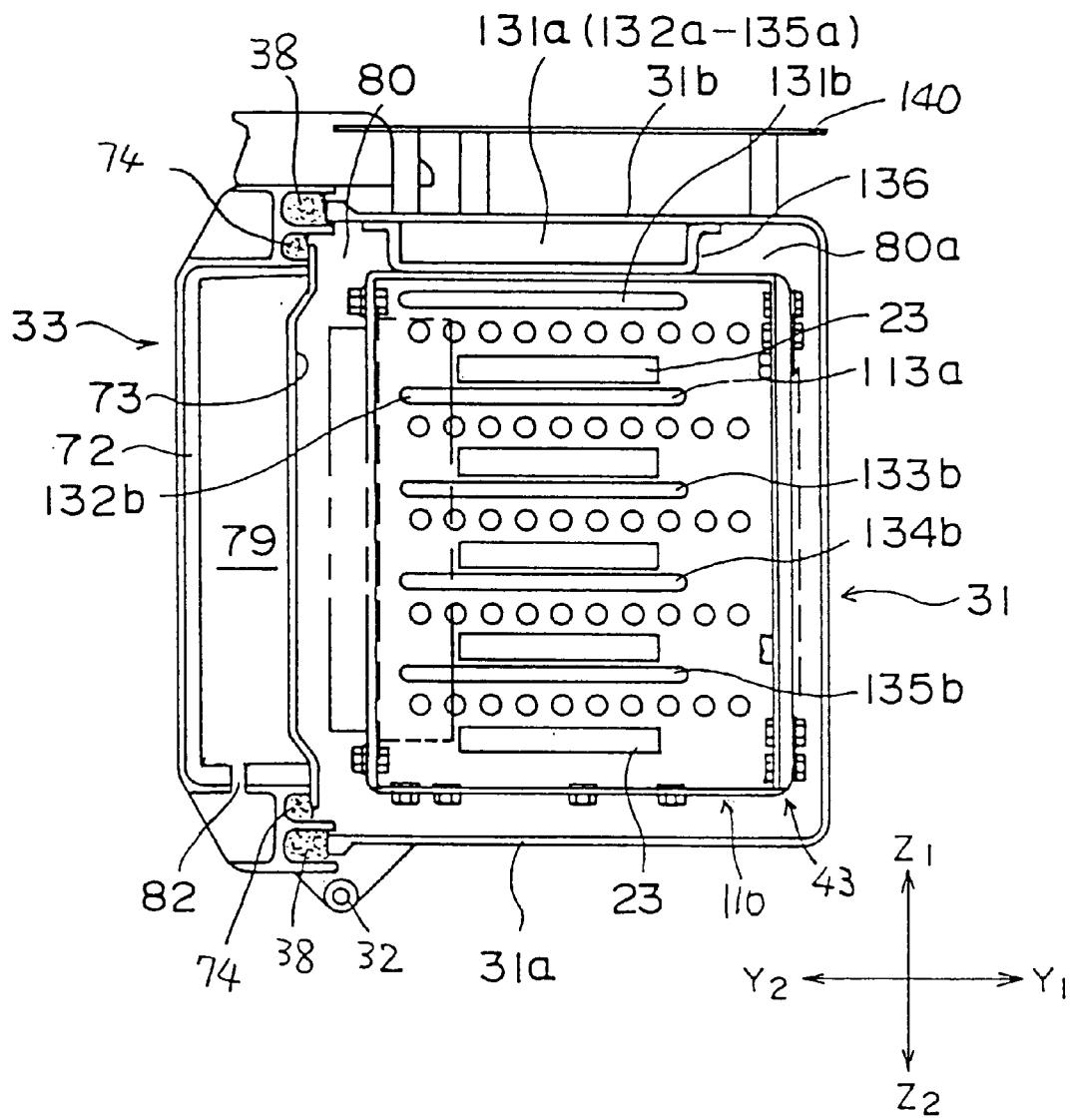
FIG. 6 shows a vertical sectional view taken along the line V—V line.

As shown in FIGS. 5 and 6 also, a light-electricity converter, multiplexer and demultiplexer unit 40, a power-source circuit device 41 which converts 100 V AC to a DC voltage for enabling the optical subscriber-line network unit 30 to operate, a battery portion 42 which backs up power when power failure occurs, a subscriber channel unit portion 43, an optical fiber slack treatment portion 44 and so forth are built in the cabinet body 31.

Figure 4:
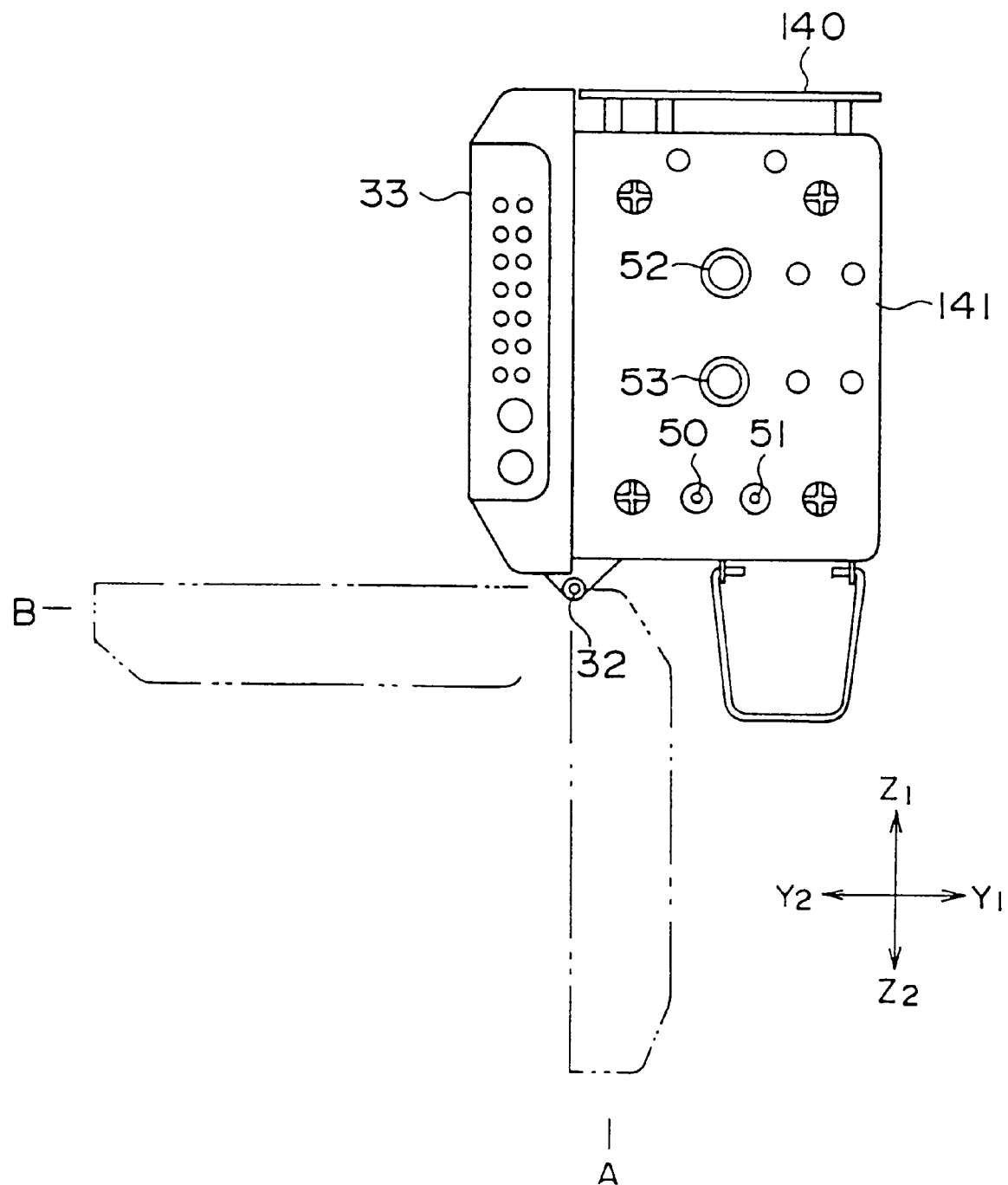
FIG. 4 shows a side elevational view of the optical subscriber-line network unit of FIG. 2.

As shown in FIG. 4 also, in the side wall at the X1 direction end of the cabinet body 31, waterproof optical-cable connectors 50 and 51, and waterproof power-supply-line connectors 52 and 53 are provided. In the installed state, the optical cable 13 from a telephone station is connected to the optical cable connector 50. A power line 17 is connected to the power-supply-line connector 52. To the optical cable connector 51, an optical cable extending from a CATV device (not shown in the figures) is connected.

External metal cables 18 are introduced into the optical subscriber-line network unit 30 through holes 55 of the side wall 54 at the X1 direction end of the door 33.

As shown in FIG. 2, inside the cabinet body 31, an optical fiber 57 extends from the optical cable connector 50, as indicated by a broken line, has slack treatment performed thereon through the optical fiber slack treatment portion 44, and is connected to a light-electricity converter portion of the light-electricity converter, multiplexer and demultiplexer unit 40. A plurality of electric wires 58, as indicated by broken lines, extend from a multiplexer and demultiplexer portion of the light-electricity converter, multiplexer and demultiplexer unit 40, and are connected to subscriber channel units 23 of the subscriber channel unit portion 43, respectively. From the subscriber channel units 23, electric wires 59 extend and the extending ends of the electric wires 59 are connected to a connector 60, respectively. Ends of the external metal cables 18 are connected to the connector 60 and the other ends of the cables 18 are connected to the houses, respectively.

The optical subscriber-line network unit 30 ordinarily operates with power supplied through the power line 17. At a time of power failure, the unit 30 continues to operate as a result of power being supplied by a battery of the battery portion 42. When the power failure continues for long time, a service staff member who has brought a battery connects the electric wire from the battery to the power-supply-line connector 53. Thereby, the optical subscriber-line network unit 30 can operate.

When the optical subscriber-line network unit 30 is installed, the door 33 is held by a hook 65 (shown in FIG. 2) so that rotation of the door 33 to the downward position (A position in FIG. 4) is prevented and the horizontal position (B position in FIG. 4) is maintained. Accordingly, the door 33 can be used as a tray on which tools can be put, for example.

Portions of the optical subscriber-line network device 30 will now be described.

As shown in FIG. 3, some of the holes 55 of the door 33 which are not used for having the external metal cables 18 pass therethrough are stopped up by stoppers 70.

Figure 7:
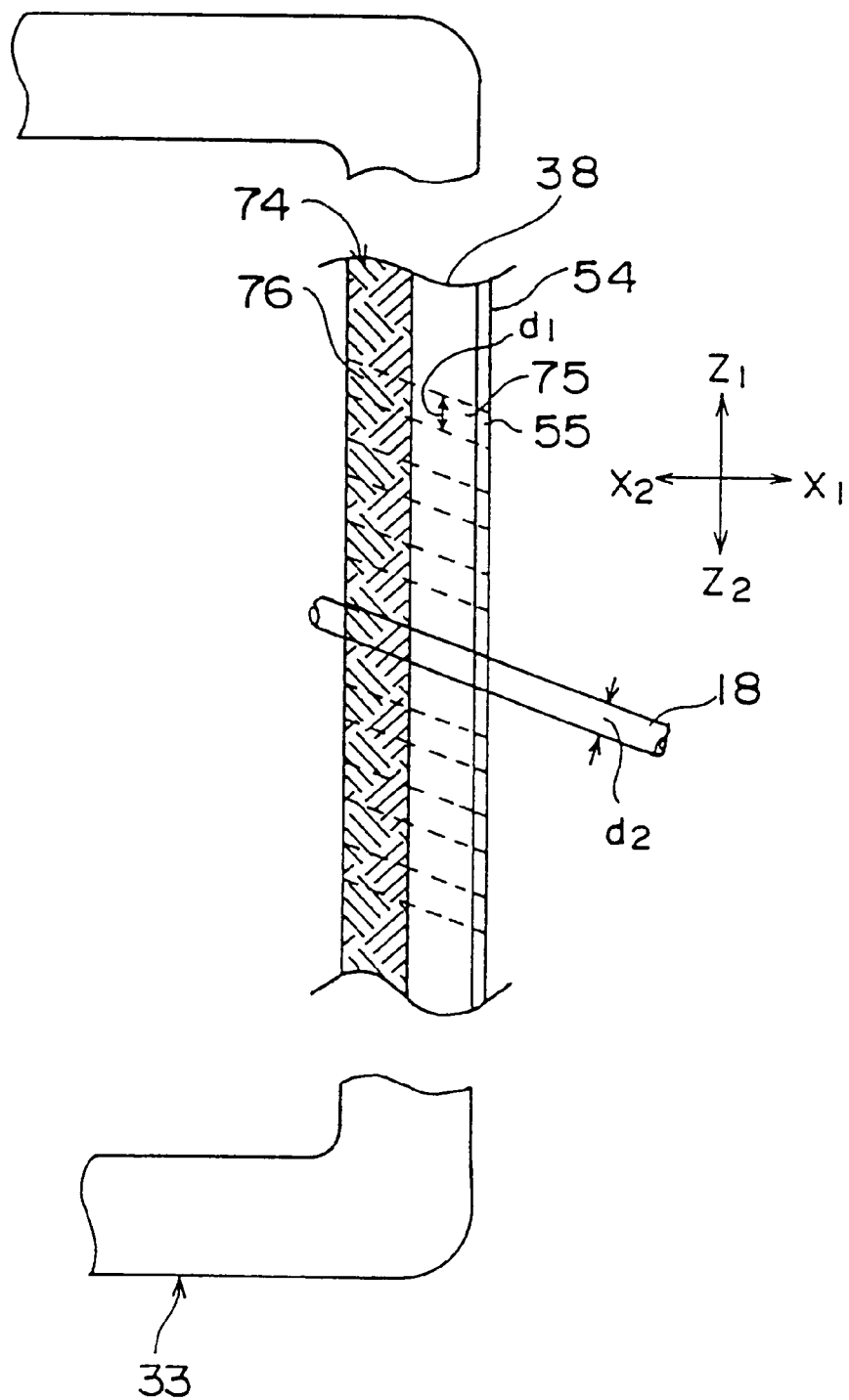
FIG. 7 shows a waterproof structure of an external metal cable introducing portion.

As shown in FIG. 2, the door 33 has a shallow depressed shape, and a synthetic-resin flat box 71 is provided inside the door 33 in a manner in which the box 71 is tightly fitted into inner walls of the door 33. The box 71 is provided in an X1-direction side of the door 33, and takes approximately half of the inside space of the door 33. The box 71 includes a box body 72 and a lid 73, and a rubber-made frame-shaped waterproof packing 74 is provided at the periphery of the box body 72. A portion at the X1-direction end has a structure, as shown in FIG. 7, in which the side wall 54, the waterproof packing 38 and the waterproof packing 74 are arranged side by side. Through holes 75 and 76 are formed in the waterproof packings 38 and 74 in accordance with the respective holes 55 of the side wall 54 of the door 33. The through holes 75 and 76 are arranged side by side and, in the condition where the door 33 is closed, are inclined so that the holes 55 are positioned at the Z2 side (bottom side). The diameter d1 of each of the through holes 75 and 76 is slightly smaller than the diameter d2 of each external metal cable 18. Accordingly, the external metal cables 18 are tightly inserted into the through holes 75 and 76. The external metal cables 18 outside of the holes 55 extend obliquely downward.

Further, with reference to FIG. 2, portions at which the electric wires 59 pass through a side wall 77 of the box body 72 are sealed. Sealing finished portions 78 are used. The sealing finished portions 78 are formed in the factory which manufactures the optical subscriber-line network unit 30. Accordingly, high reliability is provided. The connector 60 is positioned inside the box body 72, and the external metal cables 18 introduced into the optical subscriber-line network unit 30 are connected to the connector 60 inside the box body 72.

In the condition where the optical subscriber-line network unit 20 has been installed, as shown in FIG. 6, the door 73 has been closed and the door 33 has been closed. In the condition where the door 73 has been closed, the box 71 has been sealed, and the space 79 of the box 71 is shut off from and independent of the remaining inside space 80 of the optical subscriber-line network unit 30. In the space 80, the light-electricity converter, multiplexer and demultiplexer unit 40 and so forth are arranged.

Because the holes 55 which are not used are stopped up by the stopper 70, rain water is prevented from entering through the holes 55. Further, because the external metal cable 18 extends obliquely downward, rain water flowing on and along the external metal cables 18 does not reach the holes 55. Because the through holes 75 and 76 extend obliquely downward, even if rain water enters into the through holes 75 and 76 midway, the rain water flows out from the optical subscriber-line network unit 30.

If rain water has entered the optical subscriber-line network unit 30 due to the installation work of inserting the external metal cables 18 at the worst case, the rain water enters the box 71. Because the space 80 in which the light-electricity converter, multiplexer and demultiplexer unit 40 and so forth are arranged is shut off from and independent of the inside space 79 of the box 71, the rain water which has entered the space 79 of the box 71 does not enter the space 80. Accordingly, waterproofing for the light-electricity converter, multiplexer and demultiplexer unit 40 and so forth is perfect.

As shown in FIG. 6, a small draining hole 82 is provided in the box body 72 and the door 33, as shown in FIG. 6. As shown in the figure, in the condition where the door 33 has been closed, the draining hole 82 is positioned at the bottom wall of the door 33. Rain water which has entered the box 71 is drained through the draining hole 82 externally.

Figure 8:
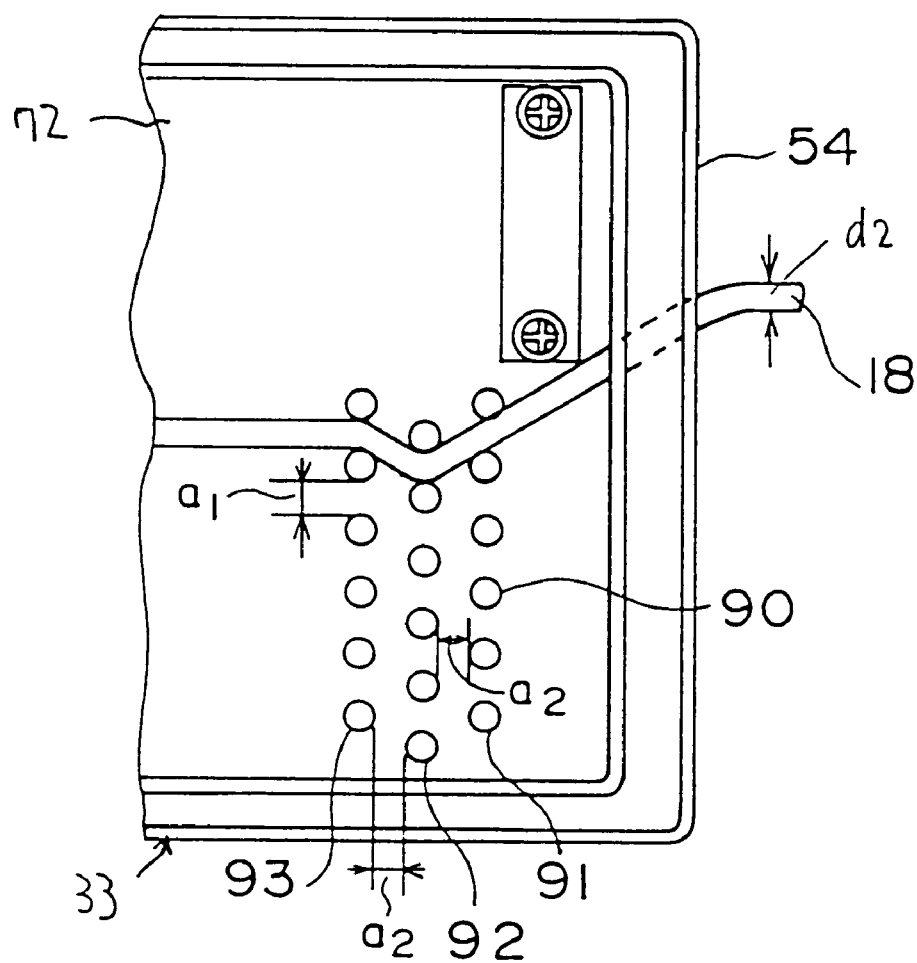
FIG. 8 shows an external metal cable holding structure.

As shown in FIGS. 2 and 8, in the box body 72, near the side wall 54, a plurality of pins 90 are arranged to form three rows in a staggered manner. The plurality of pins 90 includes a first row of pins 91, a second row of pins 92 and a third row of pins 93. Each of a distance a1 between adjacent pins of each row and a distance a2 between adjacent rows is determined to be a little larger than the diameter d2 of each external metal cable 18. The pins 90 are formed in an integral molding method together with the box body 72 and project from the bottom of the box body 72.

As shown in FIG. 8, each external metal cable 18 introduced into the box 71 from the outside winds through and is thus laid across the three rows of pins. In such an arrangement, due to the friction forces occurring between the external metal cables 18 and pins 90, the cables 18 are held by the pins 90. Accordingly, even if the external metal cables 18 outside of the optical subscriber-line network unit 30 are strongly pulled, this pulling force is received at the position of the pins 90. Accordingly, the pulling force is not transmitted to the connection portion with the connector 60. It is easy for the external metal cables 18 to be held by the pins only by pushing the cables from the top of the pins 90 into spaces between the pins 90.

Thereby, in comparison to a case where a clamp member is used, the plurality of external metal cables 18 are easily held without using tools in the narrow space. Because the plurality of external metal cables 18 are held in the narrow space, the optical subscriber-line network unit 30 is miniaturized.

The number of rows of the plurality of pins 90 may be 4 or 5.

The battery portion 42 is provided inside of the sealed space 80 of the optical subscriber-line network unit 30. Even if the optical subscriber-line network unit 30 is installed in a cold district, the space of the optical subscriber-line network unit 30 is heated by heat emitted by the power-source circuit device 41 and so forth, and thus, the temperature of this space is appropriate. Accordingly, even if the optical subscriber-line network unit 30 is installed in a cold district, the temperature of the battery is not cooled to a temperature at which the battery does not operate normally. Thus, the temperature of the battery is maintained to be a temperature at which the battery operates normally. However, because the battery is placed in the sealed space 80, measures should be taken for hydrogen which may be generated when the battery is in an excessively charged condition due to some cause. The measures will now be described.

Figure 9:
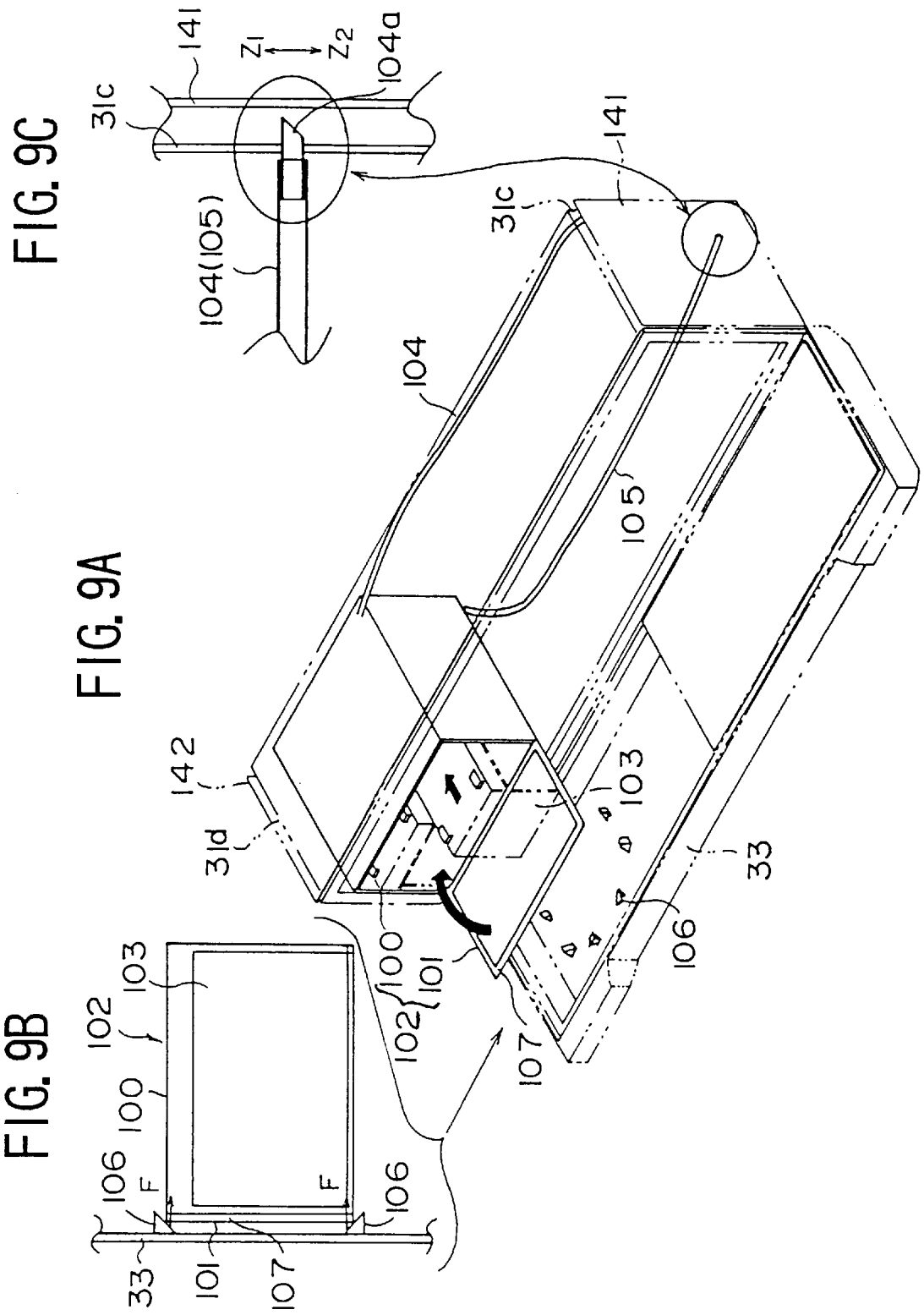
FIGS. 9A, 9B and 9C show a structure of a battery portion.

As shown in FIGS. 9A, 9B and 9C, in the battery portion 42, two batteries 103 are contained in a box 102 which includes a box body 100 and a front lid 101, and hoses 104 and 105, for causing hydrogen being emitted from the top portion and the bottom portion of the box body 100 to flow out to the outside of the optical subscriber-line network unit 30, extend to the outside of a X1-side side wall 31c of the cabinet body 31 and the inside of a side plate 141 (which will be described later). Packing 107 is provided at the periphery of the lid 101.

Through the hoses 104 and 105, the inside of the box 102 can communicate by air with the open air outside of the optical subscriber-line network unit 30.

Hydrogen generated when the battery 103 is excessively charged passes through the hoses 104 and 105 and thus is caused to flow out to the outside of the optical subscriber-line network unit 30. Further, as described later, because the packing 107 of the lid 101 is pressed onto the box body 100 and thus the lid 101 is firmly closed, the generated hydrogen does not leak to the space 80 from the box 102. Accordingly, there is no danger that the optical subscriber-line network unit 30 will explode.

Projections 106 (which may be long ribs), each having a triangle cross section, are formed on the inner wall of the door 33 at the periphery of the lid 101 when the door 33 has been closed. The batteries 103 are contained in the box body 100, the lid 101 is closed, the door 33 is closed and the buckle 34 fastens the door 33. In this condition, as shown in FIG. 9B, the projections 106 press the periphery of the lid 101 with the forces F.

Because the hoses 104 and 105 are connected at the top portion and the bottom portion of the box body 100, convection is likely to occur in the box 102. Thereby, generated hydrogen is smoothly discharged. The hoses 104 and 105 may be connected at portions other than the top portion and bottom portion of the box body 100.

As shown in FIG. 9C, the extending end of the hose 104 (105) is obliquely cut and the opening 104a faces downward. Accordingly, it is not likely that rain water will enter from the opening 104a.

As shown in FIG. 5, the light-electricity converter, multiplexer and demultiplexer unit 40, the power-source circuit device 41, the battery portion 42 and the subscriber channel unit portion 43 are arranged so that the power-source circuit device 41 is treated as a center and the light-electricity converter, multiplexer and demultiplexer unit 40, the battery portion 42 and the subscriber channel unit portion 43 are arranged radially so as to surround the power-source circuit device 41.

By this arrangement, it is possible to shorten the lengths of the electric wires 58, 59 and so forth inside the optical subscriber-line network unit 30. Accordingly, unnecessary electromagnetic wave radiation from the electric wires 58, 59 and so forth inside the optical subscriber-line network unit 30 is reduced. As a result, operation quality of the optical subscriber-line network unit 30 is improved. Further, because the lengths of the electric wires 58, 59 and so forth can be shortened, the space necessary for containing the electric wires 58, 59 and so forth can be narrowed. Accordingly, it is possible to miniaturize the optical subscriber-line network unit 30. Further, because the lengths of the electric wires 58, 59 and so forth can be shortened, voltage loss can be reduced.

Figure 10:
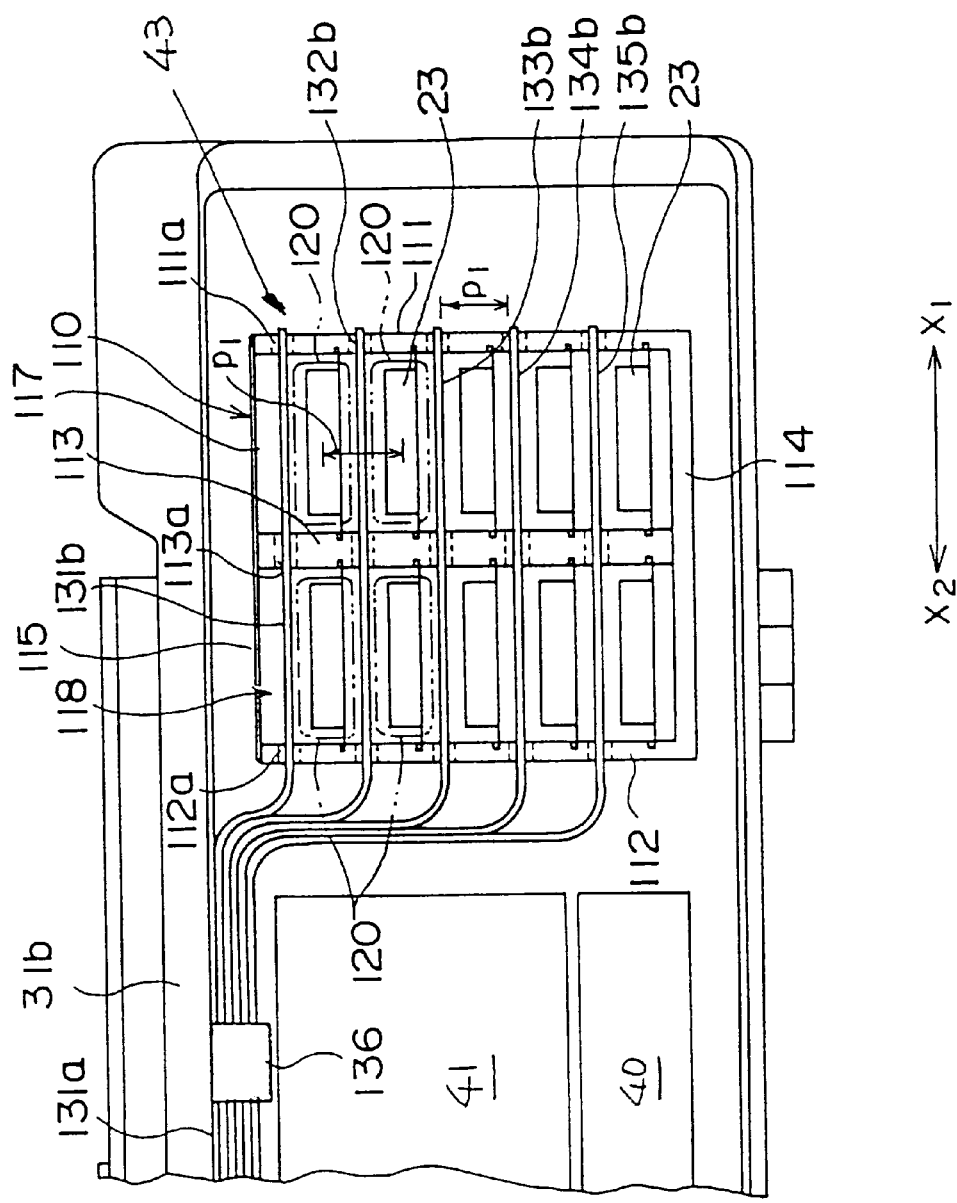
FIG. 10 shows a magnified front view of a subscriber channel unit portion.

As shown in FIG. 10, the subscriber channel unit portion 43 has a shelf 110. The shelf 110 includes an X1-side side plate 111, an X2-side side plate 112, a central vertical plate 113, a bottom plate 114, a top plate 115, and a back board 116. A vertically long space 117 is formed between the central vertical plate 113 and the side plate 111, and a vertically long space 118 is formed between the central vertical plate 113 and the side plate 112. In each of the spaces 117 and 118, five subscriber channel unit containing portions 120 are arranged vertically with a pitch p1.

As also shown in FIG. 10, in the side plates 111 and 112 and vertical plate 113, thin openings 111a, 112a and 113a for heat pipes to pass therethrough are formed between each vertically adjacent subscriber channel unit containing portions 120, and are arranged with the same pitch p1.

A heat pipe assembly 130 (shown in FIG. 5) has a long-plate shape and is a combination of five heat pipes 131 through 135 which are appropriately bent. The X2-side halves 131a through 135a of the heat pipes 131 through 135 are piled closely. In the condition where the X2-side halves 131a through 135a are closely piled, the X1-side halves 131b through 135b are arranged with the pitch p1.

The X1-side halves 131b through 135b of the heat pipe assembly 130 pass through the openings 112a of the side panel 112, extend across the space 118, pass through the openings 113a of the vertical plate 113, extend across the space 117, and pass through the openings 111a of the side panel 111, respectively. Thus, the X1-side halves 131b through 135b enter the shelf 110 in the horizontal positions. The X2-side halves 131a through 135a are piled closely and are positioned in a space 80a between a top plate 31b of the cabinet body 31 and the power-source circuit device 41. As shown in FIG. 6, the X2-side halves 131a through 135a are pressed onto the bottom surface of the top plate 31b by a clamp member 136 and clamped there. The entirety of the X2-side halves 131a through 135a are in contact with the bottom surface of the top plate 31b and the touch area is wide.

Each subscriber channel unit 23 has a plane structure in which a plurality of semiconductor components are mounted on a print board. Two side edges of the print board are guided and each subscriber channel unit 23 is received in a respective one of the subscriber channel unit containing portions 120. Thus, the subscriber channel units 23 are loaded in the shelf 110. The subscriber channel units 23 are in the horizontal positions and are arranged in five rows and two columns as shown in FIG. 10.

When considering the loaded subscriber channel units 23 as references, the X1-side halves 131b through 135b of the heat pipe assembly 130 are positioned at the top sides and bottom sides of the respective columns of subscriber channel units 23 in proximity, and are in parallel to the subscriber channel units 23, as shown in FIG. 10.

Figure 11:
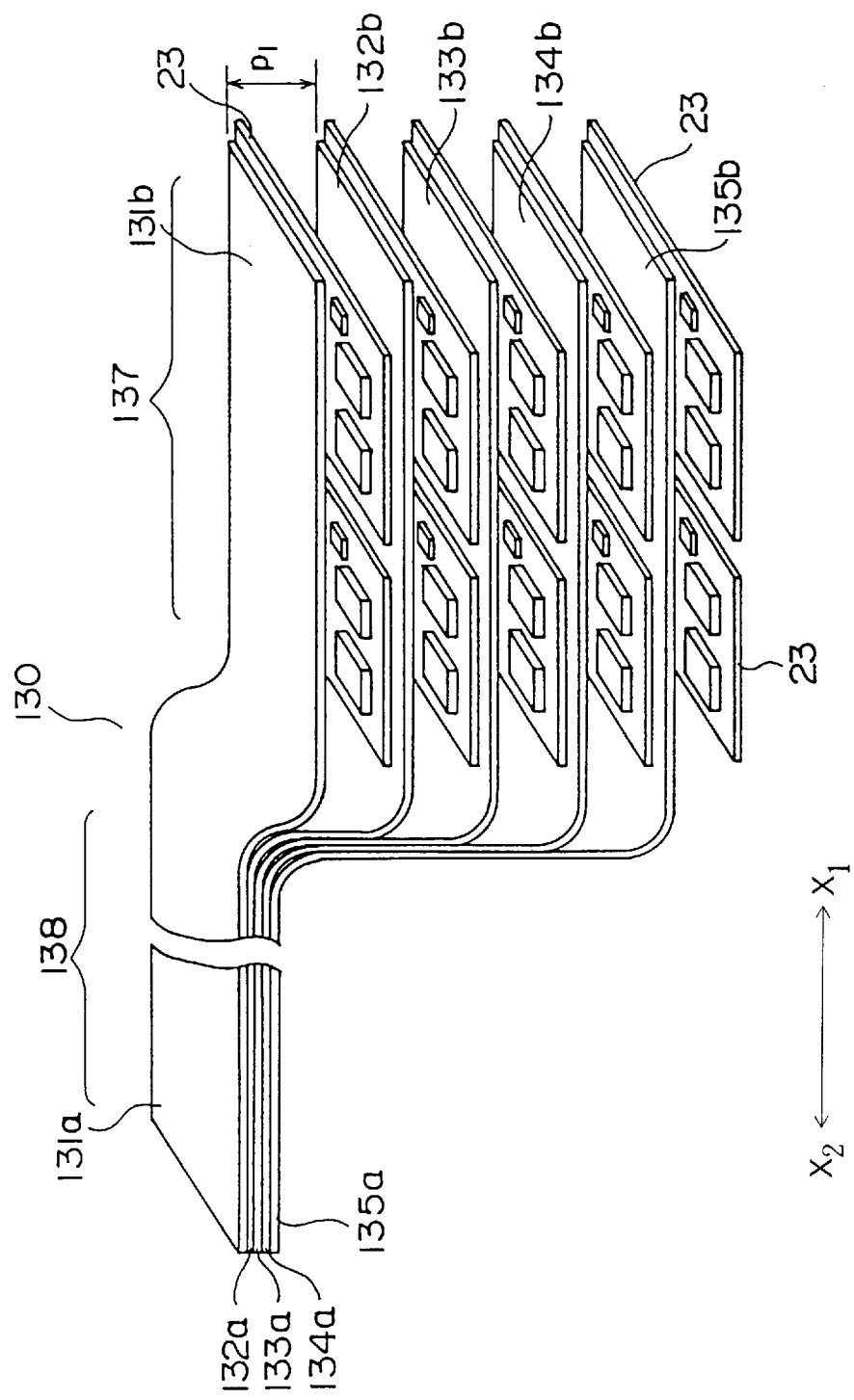
FIG. 11 shows the subscriber channel unit portion in which indication of a shelf is omitted.

The X1-side halves 131b through 135b of the heat pipe assembly 130 form a heat absorbing portion 137. The X2-side halves 131a through 135a form a radiation portion 138 (see FIG. 11).

The subscriber channel units 23 operate as amplifiers and heat generating amounts are large. The radiant heat generated at the subscriber channel units 23 is absorbed by the X1-side halves 131b through 135b of the heat pipe assembly 130 positioned at the top sides and bottom sides of the subscriber channel units 23. Because the X1-side halves 131b through 135b of the heat pipe assembly 130 have long-plate shapes, almost all of the subscriber channel units 23 are faced by the X1-side halves 131b through 135b of the heat pipe assembly 130. Accordingly, almost all of the radiant heat generated at the subscriber channel units 23 is absorbed by the X1-side halves 131b through 135b of the heat pipe assembly 130. The absorbed heat is efficiently transmitted in the heat pipe assembly 130 in the X2 direction. Then, the transmitted heat is radiated by the X2-side halves 131a through 135a through the top plate 31b of the cabinet body 31 to the outside of the optical subscriber-line network unit 30. Because the touch area between the heat pipe assembly 130 and the top plate 31b of the cabinet body 31 is wide, radiation is efficiently performed.

If the heat pipe assembly 130 is not used, radiation of the heat generated from the subscriber channel units 23 to the outside of the optical subscriber-line network unit 30 may not be sufficiently performed. Thereby, the temperature in the optical subscriber-line network unit 30 may exceed the temperature at which the subscriber channel units 23 and so forth operate normally. As a result, the operation of the optical subscriber-line network unit 30 may be unstable. However, the inventors of the present invention have confirmed, as a result of an experiment, that, by using the heat pipe assembly 130 as described above, the temperature in the optical subscriber-line network unit 30 does not exceed the temperature at which the subscriber channel units 23 and so forth operate normally. Accordingly, the optical subscriber-line network unit 30 operates stably in summer season, that is, in a thermally severe condition.

It is also possible that the X1-side halves 131$b$ through 135$b$ of the heat pipe assembly 130 are in contact with the subscriber channel units 23. In this arrangement, a similar effect can be obtained.

Further, it is possible to use a device instead of the heat pipe assembly 130 as long as the device is a good heat conductor.

As shown in FIG. 6, the top plate 31$b$ of the cabinet body 31 is provided with a sunshade plate 140 in a condition where the sunshade plate 140 is positioned above and away from the top plate 31$b$. Thereby, sunlight is prevented from being directly incident on the top plate 31$b$ of the cabinet body 31. Thereby, the temperature of the top plate 31$b$ of the cabinet body 31, with which the X2-side halves 131$a$ through 135$a$ of the heat pipes 131 through 135 are in contact, can be prevented from rising. Thereby, radiation by the X2-side halves 131$a$ through 135$a$ of the heat pipe 131 through 135 can be efficiently performed.

The side walls 31$c$ and 31$d$ of the cabinet body 31 are provided with the side plates 141 and 142 for attaching the hooks 35 (shown in FIG. 3), respectively, in a condition where the side plates 141 and 142 are away from the side walls 31$c$ and 31$d$ of the cabinet body 31, respectively.

A variant embodiment will now be described.

Figure 12:
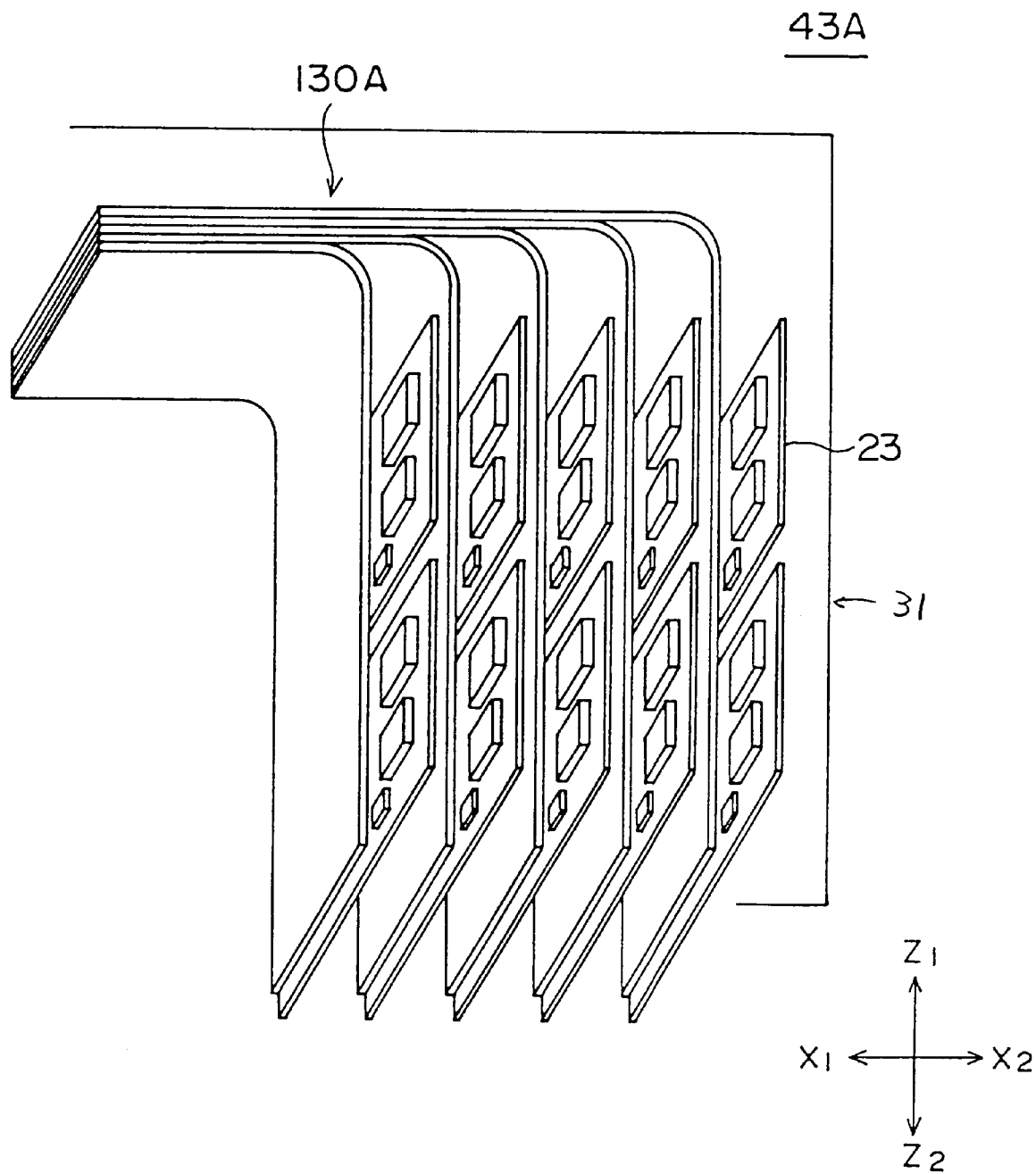
FIG. 12 shows a subscriber-channel unit portion in a variant embodiment.

FIG. 12 shows a subscriber channel unit portion 43A in a first variant embodiment. In the figure, indication of the shelf is omitted. The subscriber channel units 23 are installed in vertical positions, as shown in the figure. One end side of a heat pipe assembly 130A extends vertically, and is positioned between each pair of adjacent subscriber channel units 23. When considering the subscriber channel units 23 as references, the one end side of the heat pipe assembly 130A is in parallel to the subscriber channel units 23. The radiant heat from the subscriber channel units 23 is absorbed by the one end side of the heat pipe assembly 130A.

Figure 13:
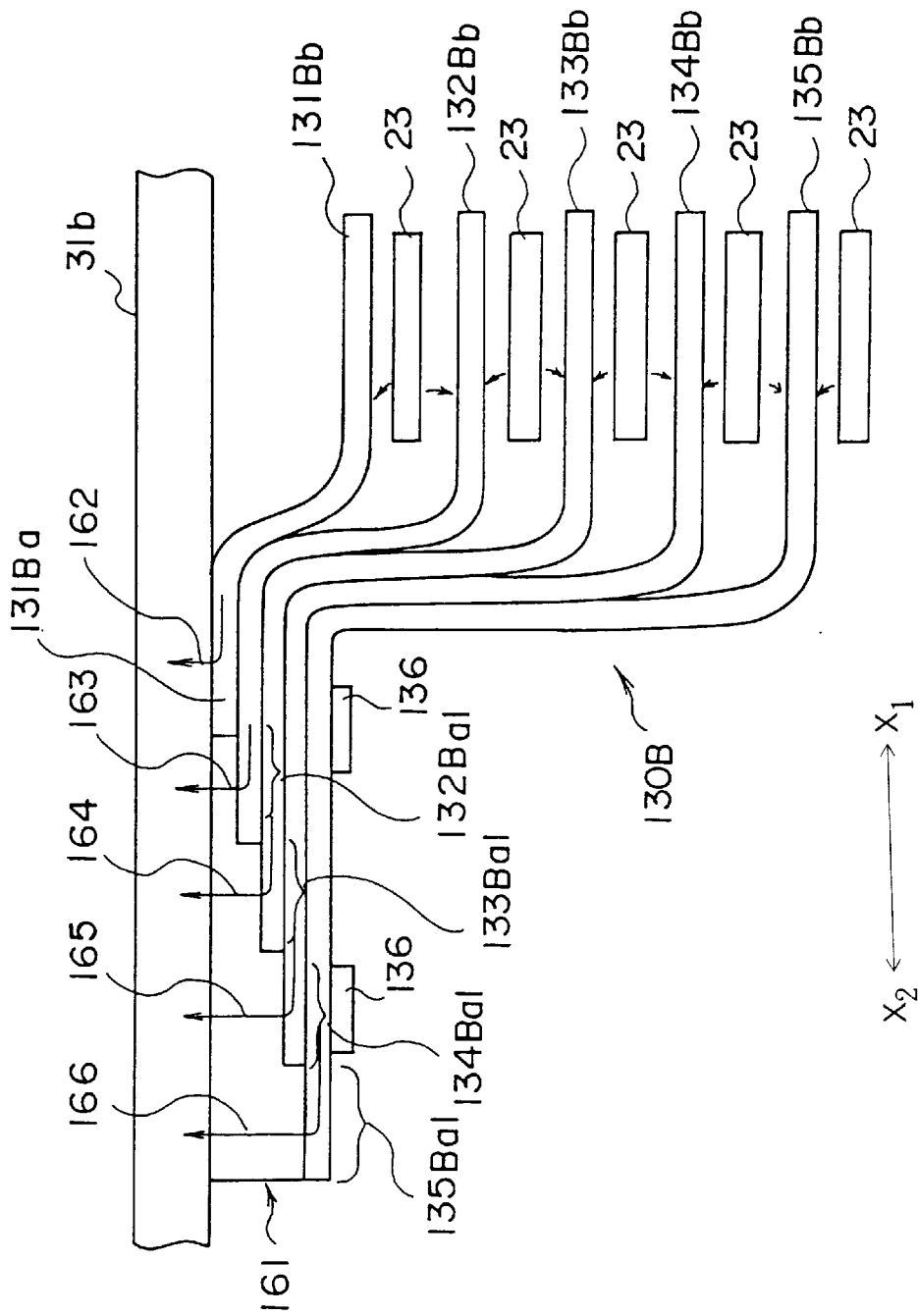
FIG. 13 shows a heat pipe assembly in a first variant embodiment with a state of radiation of the heat of subscriber channel units.
Figure 14:
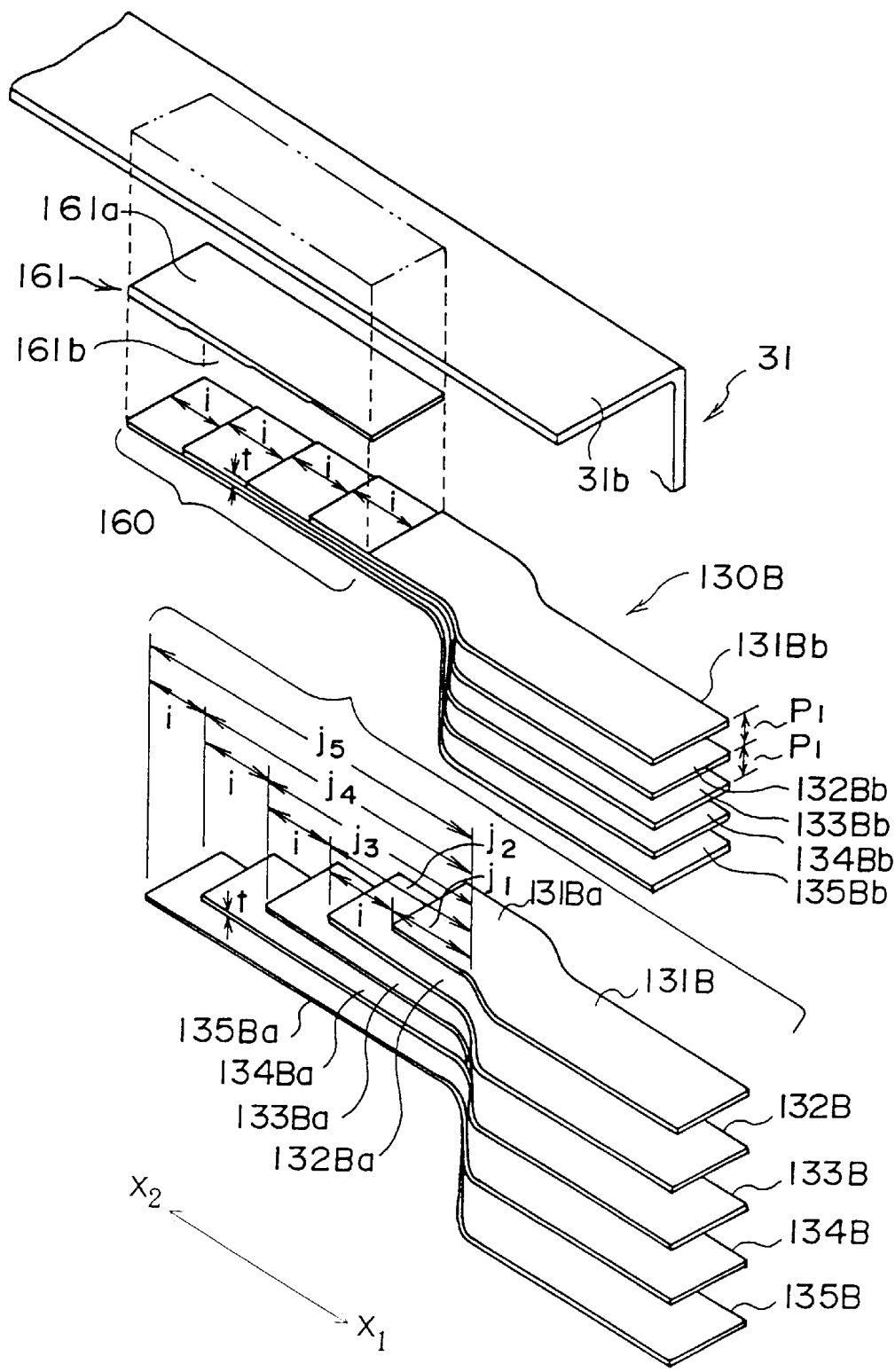
FIG. 14 shows an exploded perspective view of the heat pipes and neighboring components of FIG. 13.

FIGS. 13 and 14 show a heat pipe assembly in a first variant embodiment. The heat pipes in this variant embodiment have a structure resulting from considering that heat conduction of heat pipes in the thickness direction is not good. The X1-side half of the heat pipe assembly 130B is the same as that of the heat pipe assembly 130 shown in FIG. 11. The X2-side half of the heat pipe assembly 130B is different from that of the heat pipe assembly 130 shown in FIG. 11. In FIGS. 13 and 14, the same reference numerals are given to the same structure portions as those shown in FIG. 11.

The heat pipe assembly 130B is a combination of five heat pipes 131B through 135B, each having a long-plate shape and being appropriately bent. The X2-side portions 131B$a$ through 135B$a$ of the heat pipes 131B through 135B are closely piled, and, in this condition, the X1-side halves 131B$b$ through 131B$b$ are arranged with the pitch p1.

Each of the X2-side portions 131B$a$ through 135B$a$ is straight and the length of each lower portion is longer by a predetermined dimension 'i' than that of the immediately upper portion, as shown in FIG. 14. The lengths of the X2-side portions 131B$a$ through 135B$a$ j1, j2, j3, j4 and j5 are such that j1<j2<j3<j4<j5, and have a relationship that j2−j1=j3−j2=j4−j3=j5−j4=i.

When the X2-side portions 131B$a$ through 135B$a$ are closely piled, each lower portion projects by the equal dimension 'i' from the immediately upper portion in the X2 direction. Thus, a stair-shape portion 160, with each step height corresponding to the thickness 't' of each heat pipe, is formed, as shown in FIG. 14. The dimension by which each lower portion projects from the immediately upper portion in the X2 direction does not need to be strictly equal among the respective heat pipes but needs to be substantially equal.

An interposition member 161 has a plate shape, is made of aluminum or copper, and has a heat resistance lower than the heat resistance in the thickness direction of each heat pipe. The interposition member 161 has a plane top surface 161$a$ and a bottom surface 161$b$ of an inverted stair shape which matches the above-mentioned stair-shape portion 160.

The plane surface 161$a$ of the interposition member 161 is closely fixed to the bottom surface of the top plate 31$b$ of the cabinet body 31. The X2-side portion of the heat pipe assembly 130B is clamped by clamp members 136, and the stair-shape portion 160 is closely in contact with the bottom surface 161$b$ of the interposition member 161 as a result of the stair-shape portion 160 matching the bottom surface 161$b$ of the inverted stair shape, as shown in FIG. 13. Accordingly, the portion 131B$a$ of the heat pipe assembly 130B is directly, closely in contact with the bottom surface of the top plate 31$b$ of the cabinet body 31, and extending-end-side portion 132B$a$1 through 135B$a$1, the length of each being 'i', of the portions 132B$a$ through 135B$a$ are closely in contact with the interposition member 161.

Accordingly, as shown in FIG. 13, the radiant heat from the subscriber channel units 23 absorbed by the X1-side halves 131B$b$ through 135B$b$ of the heat pipe assembly 130B is propagated through the heat pipes 131B through 135B in the X2 direction, is propagated to the top plate 31$b$ of the cabinet body 31, and is radiated from the top plate 31$b$ to the outside of the optical subscriber channel-line network unit 30.

Propagation efficiency from the heat pipes 131B through 135B to the top plate 31$b$ will now be considered. The heat propagated through the heat pipe 131B is, as indicated by an arrow 162, directly propagated to the top plate 31$b$ from the portion 131B$a$. The heat propagated through the heat pipe 132B is, from the extending-end-side portion 132B$a$1, as indicated by an arrow 163, propagated to the top plate 31$b$ through the interposition member 161. The heat propagated through the heat pipes 133B, 134B and 135B is, from the extending-end-side portions 133B$a$1, 134B$a$1 and 135B$a$1, as indicated by arrows 164, 165 and 166, propagated to the top plate 31$b$ through the interposition member 161, respectively. Accordingly, not only the heat propagated through the heat pipe 131B, but also the heat propagated through the heat pipes 132B through 135B is propagated to the top plate 31$b$ without crossing other heat pipes in the thickness direction. (In the embodiment shown in FIG. 11, especially the heat propagated to the lowest X2-side half 135$a$ crosses the X2-side halves 134$a$, 133$a$, 132$a$ and 131$a$ in the thickness direction, and then, is propagated to the top plate 31b.) Accordingly, in the embodiment shown in FIG. 13, the heat resistance between the heat pipe assembly 130B and the top plate 31b is low, and the heat propagated through the heat pipe assembly 130B is efficiently propagated to the top plate 31b, in comparison to the embodiment shown in FIG. 11. Accordingly, the radiant heat from the subscriber channel units 23 is efficiently radiated in comparison to the embodiment shown in FIG. 11.

Figure 15:
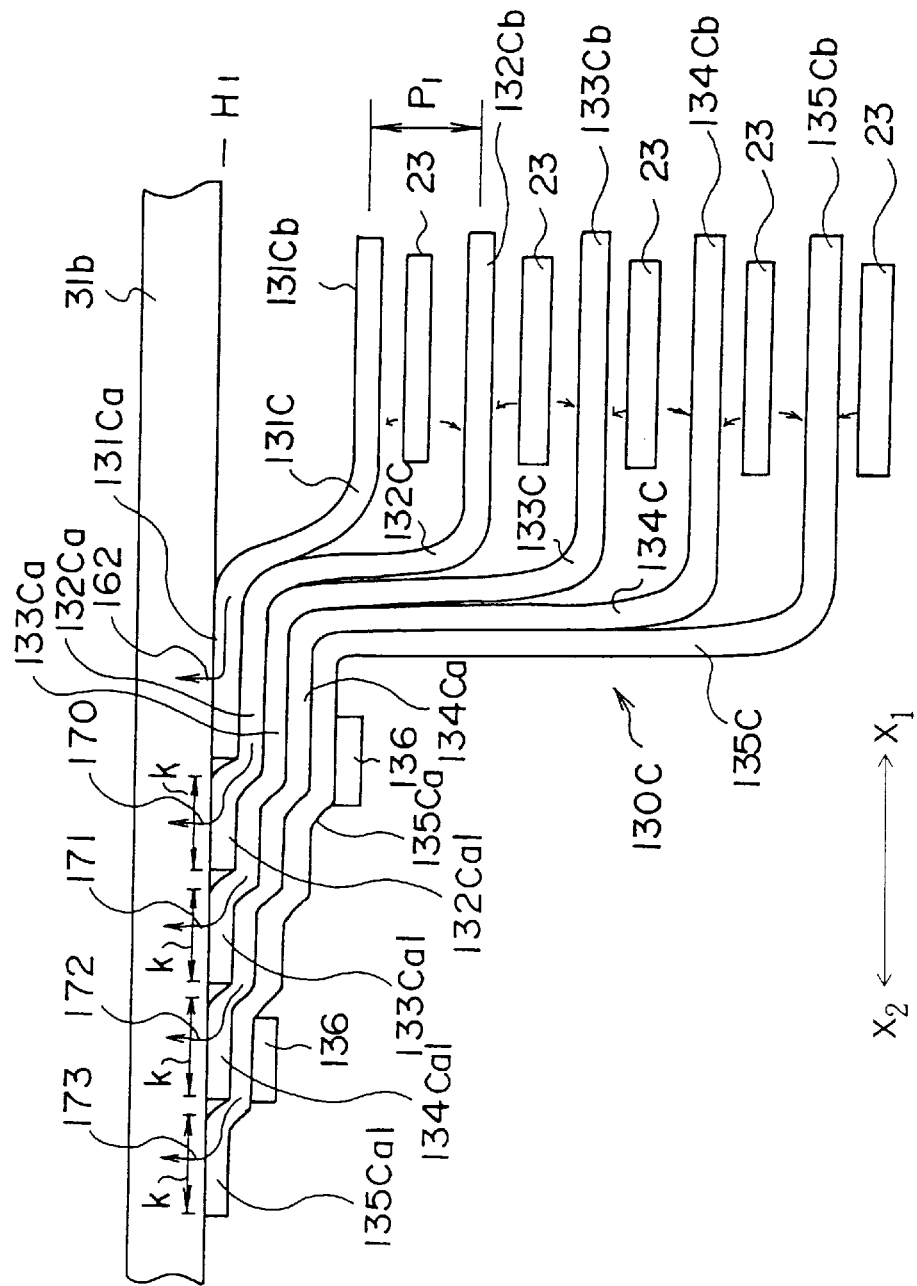
FIG. 15 shows a heat pipe assembly in a second variant embodiment with a state of radiation of the heat of the subscriber channel units.

FIG. 15 shows a heat pipe assembly in a second variant embodiment. This second variant embodiment has a structure also resulting from considering that heat conduction of heat pipes in the thickness direction is not good. The X1-side half of the heat pipe assembly 130C is the same as that of the heat pipe assembly 130 shown in FIG. 11. The X2-side half of the heat pipe assembly 130C is different from that of the heat pipe assembly 130 shown in FIG. 11. In FIG. 15, the same reference numerals are given to the same structure portions as those shown in FIG. 11. The heat pipe assembly 130C is different from the heat pipe assembly 130B shown in FIG. 13 in the point that the heat pipe assembly 130C does not use the interposition member 161.

The heat pipe assembly 130C is a combination of five heat pipes 131C through 135C, each having a long-plate shape and being appropriately bent. The X2-side portions 131Ca through 135Ca of the heat pipes 131C through 135C are closely piled, and, in this condition, the X1-side halves 131Cb through 131Cb are arranged with the pitch p1.

In the X2-side portions 131Ca through 135Ca, the length of each lower portion is longer by a predetermined dimension 'k' than that of the immediately upper portion, as shown in FIG. 15. The X2-side portion 131Ca is straight. Different from the above-described heat pipe assembly 130B, the other X2-side portions 132Ca through 135Ca are bent to be like a stair with a step height corresponding to the thickness of each heat pipe, respectively. The number of bent portions is one for the portion 132Ca, two for the portion 133Ca, three for the portion 134Ca and four for the portion 135Ca. In the condition where the five heat pipes 131C through 135C are combined, extending-end-side portions 132Ca1 through 135Ca1, the length of each being 'k', are aligned at the height H1 the same as the height of the above-mentioned X2-side portion 131Ca, as shown in FIG. 15.

In the condition where the X2-side portion of the heat pipe assembly 130C is clamped by claim members 136, the portion 131Ca and the extending-end-side portions 132Ca1 through 135Ca1 are directly, closely in contact with the bottom surface of the top plate 31b of the cabinet body 31. That is, the five heat pipes 131C through 135C are directly, closely in contact with the bottom surface of the top plate 31b independently.

Accordingly, as shown in FIG. 15, the radiant heat from the subscriber channel units 23 absorbed by the X1-side halves 131Cb through 135Cb of the heat pipe assembly 130C is propagated through the heat pipes 131C through 135C in the X2 direction, is propagated to the top plate 31b of the cabinet body 31, and is radiated from the top plate 31b to the outside of the optical subscriber channel-line network unit 30.

Propagation efficiency from the heat pipes 131C through 135C to the top plate 31b will now be considered. The heat propagated through the heat pipe 131C is, as indicated by an arrow 162, directly propagated to the top plate 31b from the portion 131Ca. The heat propagated through the other heat pipes 132C through 135C is, from the extending-end-side portion 132Ca1 through 135Ca1, as indicated by arrows 170, 171, 172 and 173, directly propagated to the top plate 31b. Accordingly, the heat propagated through the heat pipes 131C through 135C is propagated to the top plate 31b without crossing other heat pipes in the thickness direction and without crossing the interposition member (see FIG. 13). Accordingly, in the embodiment shown in FIG. 15, the heat resistance between the heat pipe assembly 130C and the top plate 31b is minimum, and the heat propagated through the heat pipe assembly 130C is efficiently propagated to the top plate 31b, in comparison to the embodiment shown in FIG. 11 and the embodiment shown in FIG. 13. Accordingly, the radiant heat from the subscriber channel units 23 is efficiently radiated in comparison to the embodiment shown in FIG. 11 and the embodiment shown in FIG. 13.

The arrangements of the above-described heat pipe assemblies 130B and 130C are advantageous especially for arrangements using heat pipes. However, these arrangements are also advantageous when being applied to good thermal conductors other than heat pipes.

The heat pipe assemblies 130B and 130C may have structures such that the heat pipes 131B through 135B, and 131C through 135C are integrated, respectively. The heat pipe assemblies 130B and 130C may have structures such that the heat pipes 131B through 135B, 131C through 135C are simply piled, respectively.

Figure 16:
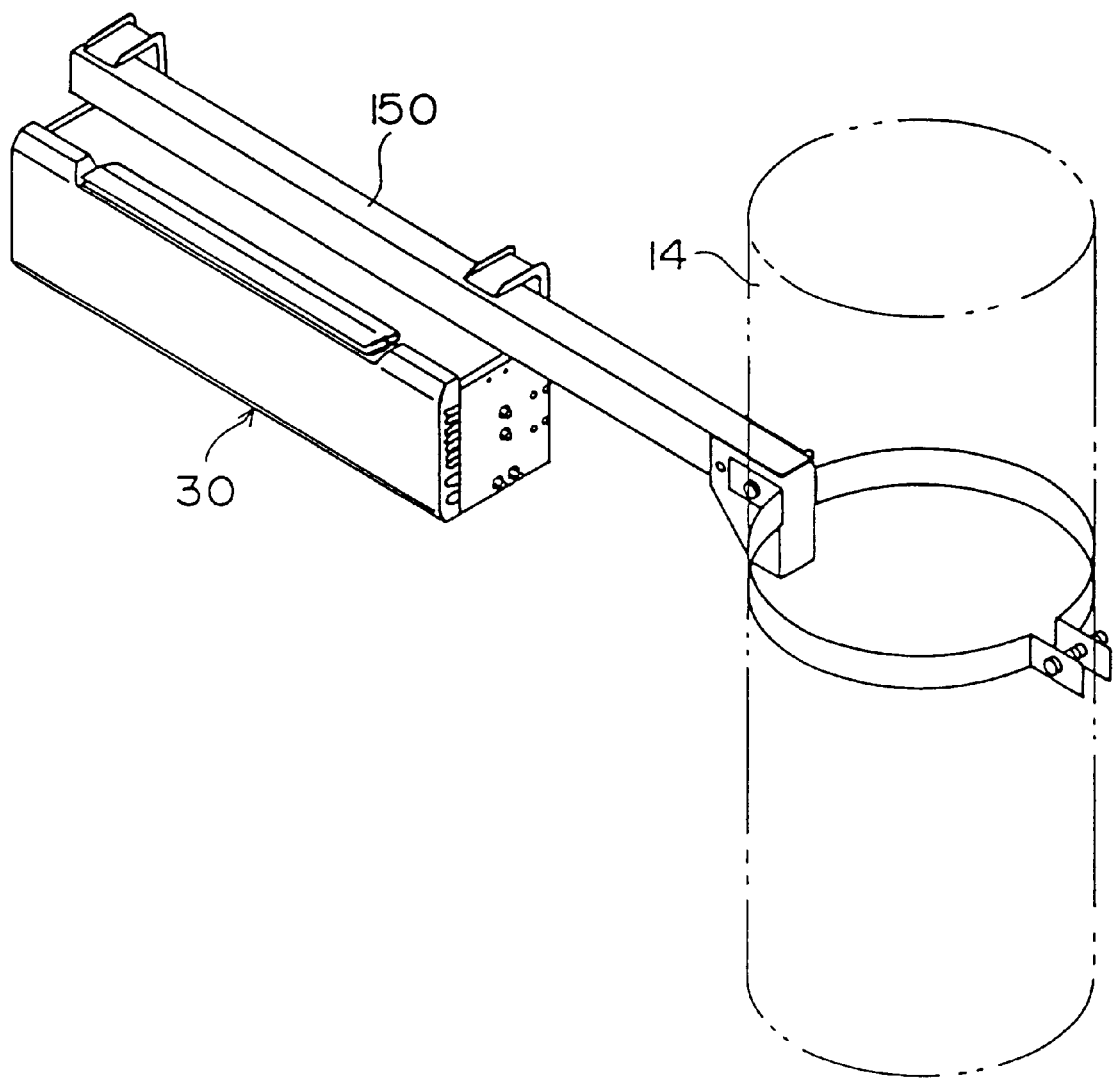
FIG. 16 shows the optical subscriber-line network unit installation in a first variant embodiment.
Figure 17:
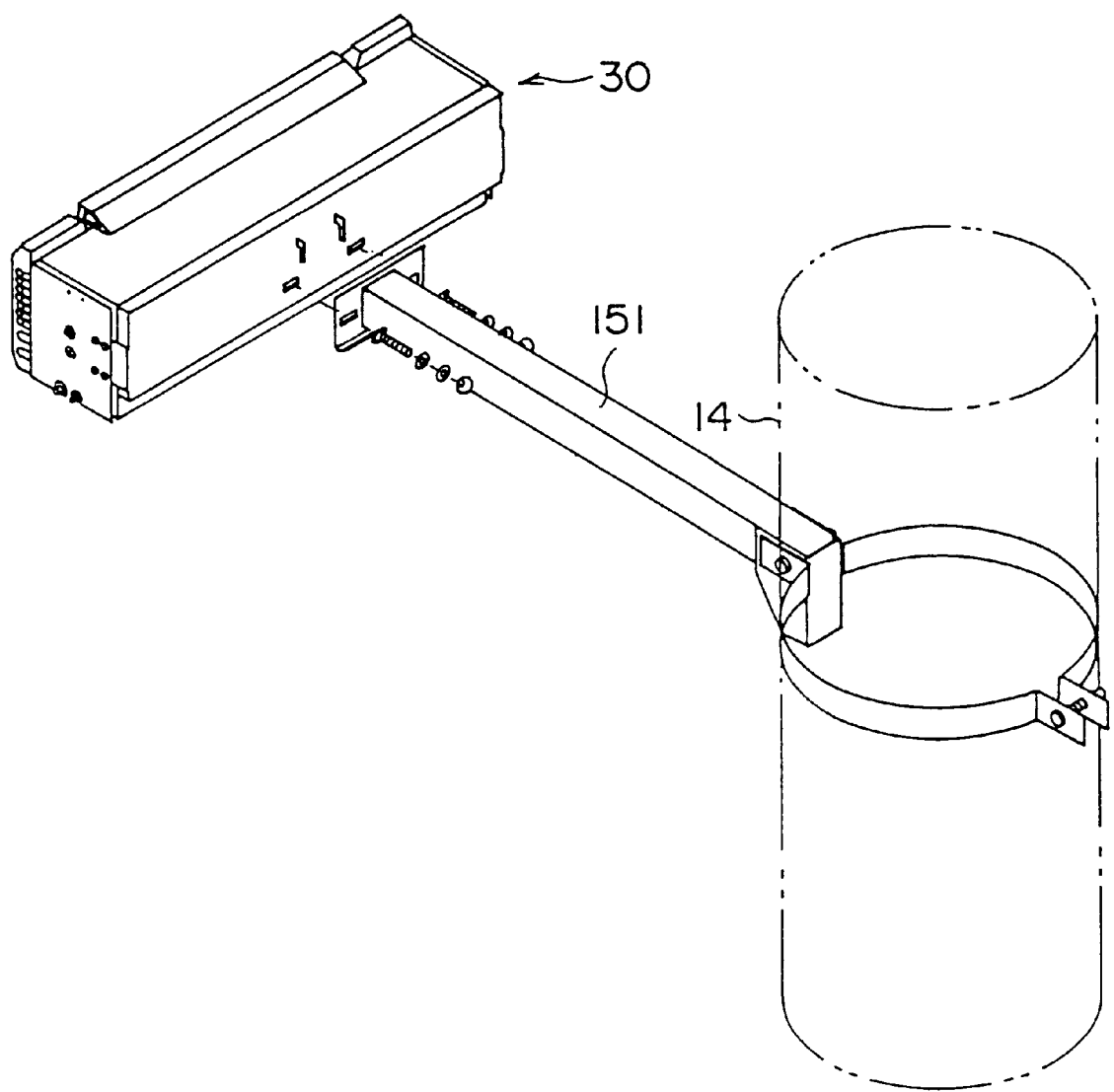
FIG. 17 shows the optical subscriber-line network unit installation in a second variant embodiment.
Figure 18:
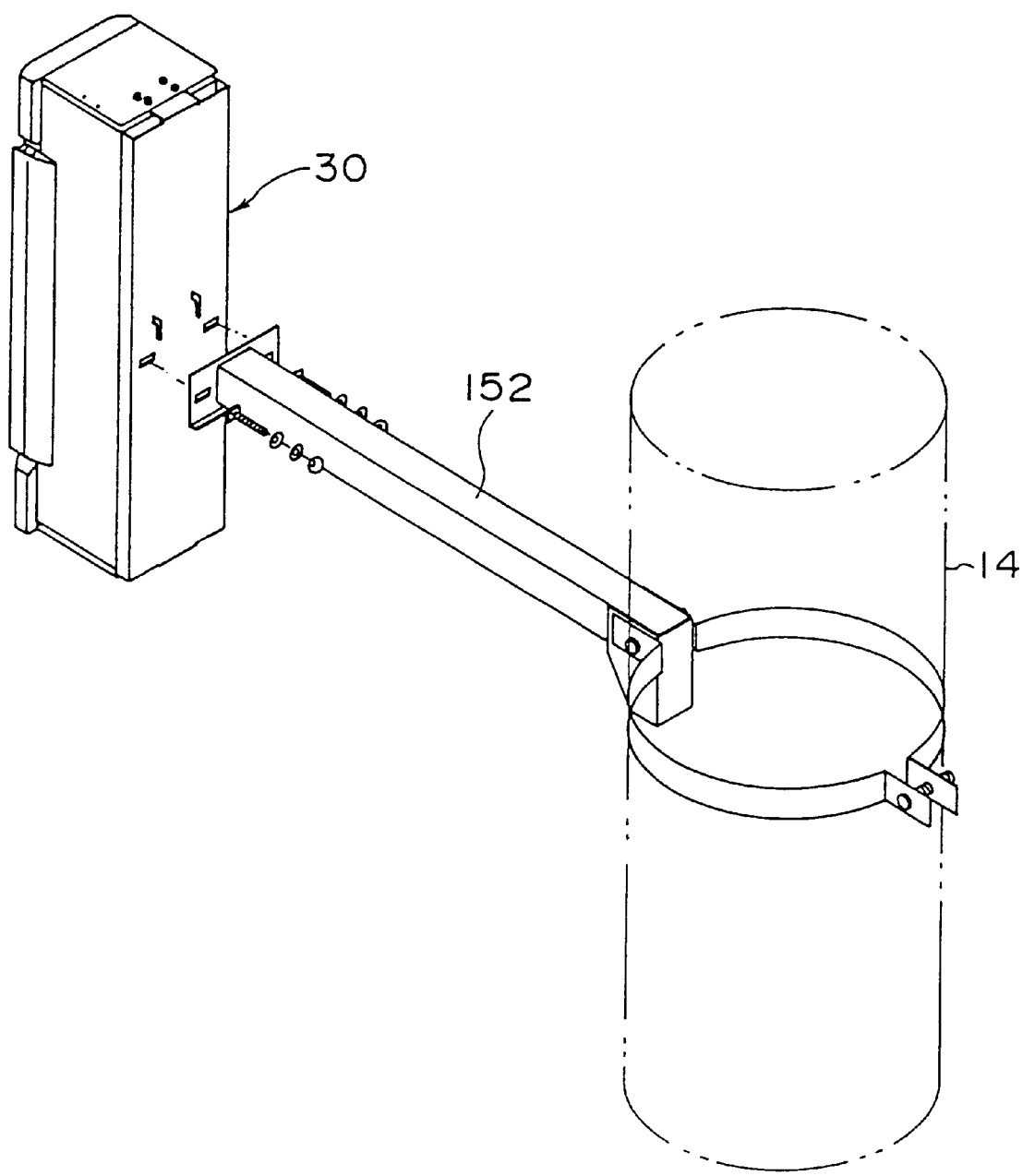
FIG. 18 shows the optical subscriber-line network unit installation in a third variant embodiment.

As shown in FIGS. 16, 17 and 18, it is possible that the optical subscriber-line network unit 30 is installed to a pole 14 in a condition where the unit 30 is away from the pole 14 using arms 150, 151 and 152, respectively. In FIG. 18, the unit 30 is installed in the vertical position.

Further, it is possible that the door 33 opens upward.

The present invention is not limited to the above-described embodiments, and variations and modifications may be made without departing from the scope of the following claims.

What is claimed is:

1. An overhead installed communication system, comprising:
   a cabinet body including an electronic circuit device and a door supported by said cabinet body through a hinge so that the door can be opened and closed, said system being installed overhead and external cables being introduced into said system,
   wherein
   a box having a lid is provided inside the door, said box being sealed in a condition where the lid is closed,
   a connector is contained in a through space provided inside said box,
   electric wires extend from the electronic circuit device and are connected to said connector, and
   the external cables are connected to said connector after being introduced into said system.

2. The overhead installed communication system according to claim 1, wherein through holes through which the external cables are introduced into said system extend obliquely downward from an inside of said system to an outside of said system.

3. An overhead installed communication system, comprising:
   a cabinet body including an electronic circuit device and a door supported by said cabinet body through a hinge so that the door can be opened and closed, said system being installed overhead and a plurality of external cables being introduced into said system,
   wherein
   a plurality of pins provided for the external cables are arranged such that the external cables are introduced, in three or more rows and in a staggered manner, the external cables extend across the rows so that the external cables pass through and wind between said pins, and a distance between each pair of adjacent pins of said plurality of pins is substantially the same as a diameter of each of the plurality of external cables.

4. An overhead installed communication system comprising:

a cabinet body including an electronic circuit device and a battery portion and a door which is supported by said cabinet body through a hinge so that the door can be opened and closed, said system being installed overhead and external cables being introduced into said system, wherein the battery portion has a structure in which a battery is contained in a sealed-structure box, and tube means to ventilate hydrogen extends from the sealed-structure box to an outside of said overhead installed communication system.

5. An overhead installed communication system comprising:

a cabinet body including an electronic circuit device and a battery portion and a door which is supported by said cabinet body through a hinge so that the door can be opened and closed, said system being installed overhead and external cables being introduced into said system, wherein the battery portion has a structure in which a battery is contained in a sealed-structure box, and tube means extends from the sealed-structure box to an outside of said overhead installed communication system, and the box includes a box body and a front lid in a condition where the door is closed, projection portions provided inside the door press a periphery of the lid to the box body.

6. The overhead installed communication system according to claim 4, wherein the tube means has an obliquely downward opening at an external end of said overhead installed communication system.

7. An overhead installed communication system comprising:

a cabinet body including a plurality of electronic circuit devices and a door which is supported by said cabinet body through a hinge so that the door can be opened and closed, said system being installed overhead and external cables being introduced into said system, wherein the electronic circuit devices comprise a light-electricity converter, multiplexer and demultiplexer unit, a power-source circuit device, a battery portion, and a subscriber channel unit portion, and the power-source circuit device is treated as a center and the light-electricity converter, multiplexer and demultiplexer unit, the battery portion and the subscriber channel unit portion are arranged radially about the center so as to surround the power-source circuit device.

8. An overhead installed communication system comprising:

a cabinet body including an electronic circuit device and a door which is supported by said cabinet body through a hinge so that the door can be opened and closed, said system being installed overhead and external cables being introduced into said system, wherein the electronic circuit device includes a shelf in which a print board assembly of a plurality of print boards are loaded, and good-thermal-conductor members having a first end in contact with an inner surface of said cabinet body and a second end which passes through the shelf and is arranged in parallel to said loaded print board assembly, and the print boards and the good-thermal-conductor members are disposed alternately so that the print boards are not in contact with the good-thermal-conductor members.

9. An overhead installed communication system comprising a cabinet body including an electronic circuit device in which a print board assembly of a plurality of print boards is loaded in a shelf and a door which is supported by said cabinet body through a hinge so that the door can be opened and closed, said system being installed overhead and external cables being introduced into said system, wherein said system comprises a good-thermal-conductor member assembly in which a plurality of a good-thermal-conductor members, each having a long-plate shape and being bent appropriately, are piled, and a good thermally conductive interposition member having a first side surface closely fixed onto an internal surface of said cabinet body, and a second side surface affixed to a first end side of the good-thermal-conductor member assembly, wherein the first end side of said good-thermal-conductor member assembly has a stair shape as a result of the good-thermal-conductor members having different lengths in sequence being piled, and, in a second end side of said good-thermal-conductor member assembly, each good-thermal-conductor member passes through the shelf and is arranged in parallel to the loaded print board assembly, the second side surface of the good thermally conductive interposition member having a stair shape corresponding to the stair shape of the first end side of the good-thermal-conductor member assembly, and the first end side of the good-thermal-conductor member assembly of the stair shape coming into contact with the second side surface of the good thermally-conductive interposition member of the second stair shape, and thus, each good-thermal-conductor member being in close contact with the good thermally conductive interposition member.

10. An overhead installed communication system comprising:

a cabinet body including an electronic circuit device in which a print board assembly of a plurality of print boards is loaded in a shelf and a door which is supported by said cabinet body through a hinge so that the door can be opened and closed, said system being installed overhead and external cables being introduced into said system, wherein said system comprises a good-thermal-conductor member assembly in which a plurality of good-thermal-conductor members, each having a long plate shape and being bent appropriately, are piled, in a first end side of the good-thermal-conductor member assembly, good-thermal-conductor members, which have different lengths in sequence and are bent in step heights each corresponding to a thickness of each good-thermal-conductor member, are piled, and all of the good-thermal-conductor members have the-same height at extending end side portions, and, in a second end side of the good-thermal-conductor member assembly, each good-thermal-conductor member passes through the shelf and is arranged in parallel to the loaded print board assembly, and the extending end side portions of the good-thermal-conductor members of the good-thermal-conductor member assembly are independently, closely in contact with an inner surface of said cabinet body, respectively.

11. The overhead installed communication system according to claim 8, wherein said cabinet body is provided with a sunshade plate in a condition where the sunshade plate is positioned away from said cabinet body to cover a top plate of said cabinet body.

12. The overhead installed communication system according to claim 9, wherein said cabinet body is provided with a sunshade plate in a condition where the sunshade plate is positioned away from said cabinet body to cover a top plate of said cabinet body.

13. The overhead installed communication system according to claim 10, wherein said cabinet body is provided with a sunshade plate in a condition where the sunshade plate is positioned away from said cabinet body to cover a top plate of said cabinet body.

14. The overhead installed communication system according to claim 1, wherein the box has a drainage hole.

15. The overhead installed communication system according to claim 11, wherein the sunshade plate is provided for the inner surface of said cabinet body.

16. An overhead communication system, comprising:
   a cabinet body including an electronic circuit device and a door supported by said cabinet body so that the door can be opened and closed, external cables being introduced into said system;
   a box provided inside the door;
   a connector contained in a through space provided inside said box to introduce the external cables; and
   electric wires extending from the electronic circuit device and connected to said connector.

* * * * *